United States Patent
Marchisio

(10) Patent No.: US 7,269,598 B2
(45) Date of Patent: *Sep. 11, 2007

(54) EXTENDED FUNCTIONALITY FOR AN INVERSE INFERENCE ENGINE BASED WEB SEARCH

(75) Inventor: Giovanni B. Marchisio, Kirkland, WA (US)

(73) Assignee: Insightful Corporation, Seattle, WA (US)

(*) Notice: Subject to any disclaimer, the term of this patent is extended or adjusted under 35 U.S.C. 154(b) by 435 days.

This patent is subject to a terminal disclaimer.

(21) Appl. No.: 10/855,786

(22) Filed: May 26, 2004

(65) Prior Publication Data

US 2005/0021517 A1 Jan. 27, 2005

Related U.S. Application Data

(63) Continuation of application No. 09/962,798, filed on Sep. 25, 2001, now Pat. No. 6,757,646, which is a continuation-in-part of application No. 09/532,605, filed on Mar. 22, 2000, now Pat. No. 6,510,406.

(60) Provisional application No. 60/235,255, filed on Sep. 25, 2000.

(51) Int. Cl.
G06F 17/00 (2006.01)
G06F 7/00 (2006.01)

(52) U.S. Cl. .................... 707/102; 101/2; 101/205

(58) Field of Classification Search ............. 707/104.1, 707/102, 101, 2, 205; 704/8
See application file for complete search history.

(56) References Cited

U.S. PATENT DOCUMENTS

| 4,839,853 A | 6/1989 | Deerwester et al. ........ 364/900 |
| 5,301,109 A | 4/1994 | Landauer et al. ...... 364/419.19 |
| 5,317,507 A | 5/1994 | Gallant .................. 364/419.13 |
| 5,325,298 A | 6/1994 | Gallant .................. 364/419.19 |
| 5,619,709 A | 4/1997 | Caid et al. .................. 395/794 |
| 5,778,362 A | 7/1998 | Deerwester .................... 707/5 |

(Continued)

OTHER PUBLICATIONS

Littman et al., "Automatic Cross-Language Information Retrieval Using Latent Semantic Indexing," Oct. 7, 1996.

Primary Examiner—John Cottingham
Assistant Examiner—Kuen S Lu
(74) Attorney, Agent, or Firm—Seed IP Law Group PLLC

(57) ABSTRACT

An extension of an inverse inference search engine is disclosed which provides cross language document retrieval, in which the information matrix used as input to the inverse inference engine is organized into rows of blocks corresponding to languages within a predetermined set of natural languages. The information matrix is further organized into two column-wise partitions. The first partition consists of blocks of entries representing fully translated documents, while the second partition is a matrix of blocks of entries representing documents for which translations are not available in all of the predetermined languages. Further in the second partition, entries in blocks outside the main diagonal of blocks are zero. Another disclosed extension to the inverse inference retrieval document retrieval system supports automatic, knowledge based training. This approach applies the idea of using a training set to the problem of searching databases where information that is diluted or not reliable enough to allow the creation of robust semantic links. To address this situation, the disclosed system loads the left-hand partition of the input matrix for the inverse inference engine with information from reliable sources.

36 Claims, 8 Drawing Sheets

U.S. PATENT DOCUMENTS

| | | |
|---|---|---|
| 5,794,178 A | 8/1998 | Caid et al. .................... 704/9 |
| 5,857,179 A | 1/1999 | Vaithyanathan et al. ....... 707/2 |
| 5,950,189 A | 9/1999 | Cohen et al. .................. 707/3 |
| 6,006,221 A * | 12/1999 | Liddy et al. ................... 707/5 |
| 6,026,388 A | 2/2000 | Liddy et al. ................... 707/1 |
| 6,064,951 A * | 5/2000 | Park et al. ..................... 704/8 |
| 6,192,360 B1 * | 2/2001 | Dumais et al. ................ 707/6 |
| 6,510,406 B1 | 1/2003 | Marchisio ...................... 704/9 |
| 6,757,646 B2 * | 6/2004 | Marchisio ...................... 704/8 |
| 2002/0059161 A1 | 5/2002 | Li ................................. 707/1 |
| 2003/0115191 A1 * | 6/2003 | Copperman et al. ........... 707/3 |
| 2004/0243388 A1 * | 12/2004 | Corman et al. ................ 704/1 |
| 2005/0177805 A1 * | 8/2005 | Lynch et al. ................ 715/968 |

\* cited by examiner

| | R1 | R2 | R3 | R4 | R5 | R6 | TE1 | TE2 | TE3 | TE4 | TF1 | TF2 | TF3 | T11 | T12 | T13 | T14 |
|---|---|---|---|---|---|---|---|---|---|---|---|---|---|---|---|---|---|
| comedy | 3 | 0 | 0 | 0 | 1 | 1 | 0 | 0 | 1 | 1 | 0 | 0 | 0 | 0 | 0 | 0 | 0 |
| playwright | 1 | 0 | 0 | 1 | 1 | 3 | 2 | 1 | 0 | 1 | 0 | 0 | 0 | 0 | 0 | 0 | 0 |
| London | 0 | 1 | 2 | 1 | 3 | 2 | 0 | 2 | 3 | 4 | 0 | 0 | 0 | 0 | 0 | 0 | 0 |
| ocean | 0 | 1 | 0 | 2 | 0 | 0 | 3 | 2 | 1 | 0 | 0 | 0 | 0 | 0 | 0 | 0 | 0 |
| Thames | 0 | 1 | 0 | 3 | 2 | 0 | 4 | 0 | 1 | 0 | 0 | 0 | 0 | 0 | 0 | 0 | 0 |
| bridge | 0 | 0 | 1 | 2 | 1 | 2 | 1 | 1 | 0 | 1 | 0 | 0 | 0 | 0 | 0 | 0 | 0 |
| sword | 0 | 0 | 1 | 1 | 0 | 1 | 0 | 2 | 2 | 1 | 0 | 0 | 0 | 0 | 0 | 0 | 0 |
| gate | 0 | 0 | 0 | 2 | 0 | 0 | 1 | 2 | 1 | 0 | 0 | 0 | 0 | 0 | 0 | 0 | 0 |
| sail | 0 | 0 | 0 | 0 | 0 | 0 | 0 | 0 | 0 | 0 | 0 | 0 | 0 | 0 | 0 | 0 | 0 |
| stage | 0 | 0 | 0 | 0 | 0 | 1 | 0 | 1 | 0 | 0 | 2 | 1 | 0 | 0 | 0 | 0 | 0 |
| comedie | 3 | 0 | 0 | 0 | 1 | 1 | 0 | 0 | 0 | 0 | 1 | 0 | 1 | 0 | 0 | 0 | 0 |
| dramaturge | 1 | 0 | 0 | 1 | 1 | 3 | 0 | 0 | 0 | 0 | 0 | 1 | 1 | 0 | 0 | 0 | 0 |
| Londres | 0 | 1 | 2 | 2 | 3 | 2 | 0 | 0 | 0 | 0 | 4 | 2 | 2 | 0 | 0 | 0 | 0 |
| mer | 0 | 1 | 0 | 1 | 0 | 0 | 0 | 0 | 0 | 0 | 1 | 2 | 1 | 0 | 0 | 0 | 0 |
| Tamise | 0 | 1 | 0 | 3 | 2 | 0 | 0 | 0 | 0 | 0 | 0 | 1 | 1 | 0 | 0 | 0 | 0 |
| pont | 0 | 0 | 0 | 2 | 1 | 1 | 0 | 0 | 0 | 0 | 3 | 1 | 1 | 0 | 0 | 0 | 0 |
| epee | 0 | 0 | 1 | 1 | 0 | 0 | 0 | 0 | 0 | 0 | 1 | 1 | 0 | 0 | 0 | 0 | 0 |
| portail | 0 | 0 | 1 | 2 | 0 | 0 | 0 | 0 | 0 | 0 | 1 | 0 | 0 | 0 | 0 | 0 | 0 |
| cuir | 0 | 0 | 0 | 0 | 0 | 0 | 0 | 0 | 0 | 0 | 0 | 0 | 0 | 0 | 0 | 0 | 0 |
| ile | 0 | 0 | 0 | 0 | 1 | 1 | 0 | 0 | 0 | 0 | 0 | 0 | 0 | 0 | 0 | 0 | 0 |
| commedia | 3 | 0 | 0 | 0 | 3 | 3 | 0 | 0 | 0 | 0 | 0 | 0 | 0 | 1 | 0 | 0 | 0 |
| drammaturgo | 1 | 0 | 2 | 1 | 2 | 2 | 0 | 0 | 0 | 0 | 0 | 0 | 0 | 1 | 2 | 0 | 2 |
| Londra | 0 | 1 | 0 | 1 | 0 | 0 | 0 | 0 | 0 | 0 | 0 | 0 | 0 | 2 | 0 | 0 | 1 |
| oceano | 0 | 1 | 0 | 2 | 0 | 0 | 0 | 0 | 0 | 0 | 0 | 0 | 0 | 4 | 1 | 0 | 0 |
| Tamigi | 0 | 1 | 0 | 3 | 2 | 0 | 0 | 0 | 0 | 0 | 0 | 0 | 0 | 0 | 0 | 0 | 0 |
| ponte | 0 | 0 | 0 | 2 | 1 | 0 | 0 | 0 | 0 | 0 | 0 | 0 | 0 | 2 | 0 | 0 | 0 |
| spada | 0 | 0 | 0 | 0 | 0 | 0 | 0 | 0 | 0 | 0 | 0 | 0 | 0 | 0 | 0 | 0 | 0 |
| cancello | 0 | 0 | 0 | 0 | 0 | 0 | 0 | 0 | 0 | 0 | 0 | 0 | 0 | 2 | 0 | 0 | 0 |
| palazzo | 0 | 0 | 0 | 0 | 0 | 0 | 0 | 0 | 0 | 0 | 0 | 0 | 0 | 1 | 0 | 0 | 0 |
| torre | 0 | 0 | 0 | 0 | 0 | 2 | 1 | 0 | 0 | 0 | 0 | 0 | 1 | 0 | 0 | 1 | 0 |
| mappa | 0 | 0 | 0 | 0 | 0 | 0 | 0 | 0 | 0 | 0 | 0 | 0 | 0 | 0 | 0 | 0 | 0 |
| Shakespeare | 2 | 0 | 0 | 3 | 1 | 0 | 1 | 0 | 2 | 0 | 0 | 1 | 1 | 1 | 0 | 2 | 1 |

FIG. 4a

|  | R1 | R2 | R3 | R4 | R5 | R6 | TE1 | TE2 | TE3 | TE4 | TF1 | TF2 | TF3 |
|---|---|---|---|---|---|---|---|---|---|---|---|---|---|
| comedy | 3 | 0 | 0 | 0 | 1 | 1 | 0 | 0 | 1 | 0 | 0 | 0 | 0 |
| playwright | 1 | 0 | 0 | 1 | 1 | 3 | 2 | 1 | 0 | 1 | 0 | 0 | 0 |
| London | 0 | 1 | 2 | 1 | 3 | 2 | 0 | 2 | 3 | 4 | 0 | 0 | 0 |
| ocean | 0 | 1 | 0 | 2 | 0 | 0 | 3 | 1 | 1 | 0 | 0 | 0 | 0 |
| Thames | 0 | 1 | 0 | 3 | 2 | 0 | 4 | 0 | 1 | 0 | 0 | 0 | 0 |
| bridge | 0 | 1 | 0 | 2 | 1 | 0 | 1 | 1 | 0 | 1 | 0 | 0 | 0 |
| sword | 0 | 0 | 1 | 1 | 0 | 2 | 0 | 2 | 1 | 1 | 0 | 0 | 0 |
| gate | 0 | 0 | 1 | 2 | 0 | 1 | 1 | 2 | 2 | 1 | 0 | 0 | 0 |
| sail | 0 | 0 | 0 | 0 | 0 | 0 | 1 | 0 | 0 | 0 | 0 | 0 | 0 |
| stage | 0 | 0 | 0 | 0 | 0 | 0 | 0 | 1 | 0 | 0 | 0 | 0 | 0 |
| comedie | 3 | 0 | 0 | 0 | 1 | 1 | 0 | 0 | 0 | 0 | 2 | 1 | 1 |
| dramaturge | 1 | 0 | 0 | 1 | 1 | 3 | 0 | 0 | 0 | 0 | 1 | 0 | 1 |
| Londres | 0 | 1 | 2 | 1 | 3 | 2 | 0 | 0 | 0 | 0 | 0 | 1 | 0 |
| mer | 0 | 1 | 0 | 2 | 0 | 0 | 0 | 0 | 0 | 0 | 4 | 1 | 1 |
| Tamise | 0 | 1 | 0 | 3 | 2 | 0 | 0 | 0 | 0 | 0 | 1 | 2 | 1 |
| pont | 0 | 1 | 0 | 2 | 1 | 0 | 0 | 0 | 0 | 0 | 0 | 2 | 2 |
| epee | 0 | 0 | 1 | 1 | 0 | 2 | 0 | 0 | 0 | 0 | 3 | 0 | 1 |
| portail | 0 | 0 | 1 | 2 | 0 | 1 | 0 | 0 | 0 | 0 | 1 | 1 | 1 |
| cuir | 0 | 0 | 0 | 0 | 0 | 0 | 0 | 0 | 0 | 0 | 1 | 0 | 0 |
| ile | 0 | 0 | 0 | 0 | 0 | 0 | 0 | 0 | 0 | 0 | 0 | 0 | 0 |
| Shakespeare | 2 | 0 | 0 | 3 | 1 | 2 | 1 | 0 | 2 | 0 | 0 | 1 | 1 |

56 = rows 1–10 (comedy…stage); 58 = rows 11–21 (comedie…Shakespeare); 60 = R1–R6; 62 = TE1–TE4, TF1–TF3

|  | R1 | R2 | R3 | R4 | R5 | R6 | TE1 | TE2 | TE3 | TE4 | TI1 | TI2 | TI3 | TI4 |
|---|---|---|---|---|---|---|---|---|---|---|---|---|---|---|
| comedy | 3 | 0 | 0 | 0 | 1 | 1 | 0 | 0 | 1 | 0 | 0 | 0 | 0 | 0 |
| playwright | 1 | 0 | 0 | 1 | 1 | 3 | 2 | 1 | 0 | 1 | 0 | 0 | 0 | 0 |
| London | 0 | 1 | 2 | 1 | 3 | 2 | 0 | 2 | 3 | 4 | 0 | 0 | 0 | 0 |
| ocean | 0 | 1 | 0 | 2 | 0 | 0 | 3 | 1 | 1 | 0 | 0 | 0 | 0 | 0 |
| Thames | 0 | 1 | 0 | 3 | 2 | 0 | 4 | 0 | 1 | 0 | 0 | 0 | 0 | 0 |
| bridge | 0 | 1 | 0 | 2 | 1 | 0 | 1 | 1 | 0 | 1 | 0 | 0 | 0 | 0 |
| sword | 0 | 0 | 1 | 1 | 0 | 2 | 0 | 2 | 1 | 1 | 0 | 0 | 0 | 0 |
| gate | 0 | 0 | 1 | 2 | 0 | 1 | 1 | 2 | 2 | 1 | 0 | 0 | 0 | 0 |
| sail | 0 | 0 | 0 | 0 | 0 | 0 | 1 | 0 | 0 | 0 | 0 | 0 | 0 | 0 |
| stage | 0 | 0 | 0 | 0 | 0 | 0 | 1 | 0 | 0 | 0 | 0 | 0 | 0 | 0 |
| commedia | 3 | 0 | 0 | 0 | 1 | 1 | 0 | 0 | 0 | 0 | 1 | 2 | 0 | 2 |
| drammaturgo | 1 | 0 | 0 | 1 | 1 | 3 | 0 | 0 | 0 | 0 | 1 | 0 | 1 | 1 |
| Londra | 0 | 1 | 2 | 1 | 3 | 2 | 0 | 0 | 0 | 0 | 0 | 1 | 1 | 1 |
| oceano | 0 | 1 | 0 | 2 | 0 | 0 | 0 | 0 | 0 | 0 | 2 | 0 | 1 | 0 |
| Tamigi | 0 | 1 | 0 | 3 | 2 | 0 | 0 | 0 | 0 | 0 | 4 | 0 | 1 | 0 |
| ponte | 0 | 1 | 0 | 2 | 1 | 0 | 0 | 0 | 0 | 0 | 0 | 1 | 1 | 0 |
| spada | 0 | 0 | 1 | 1 | 0 | 2 | 0 | 0 | 0 | 0 | 2 | 0 | 1 | 1 |
| cancello | 0 | 0 | 1 | 2 | 0 | 1 | 0 | 0 | 0 | 0 | 0 | 0 | 1 | 1 |
| palazzo | 0 | 0 | 0 | 0 | 0 | 0 | 0 | 0 | 0 | 0 | 0 | 0 | 0 | 0 |
| torre | 0 | 0 | 0 | 0 | 0 | 0 | 0 | 0 | 0 | 0 | 2 | 0 | 0 | 0 |
| mappa | 0 | 0 | 0 | 0 | 0 | 0 | 0 | 0 | 0 | 0 | 0 | 0 | 0 | 1 |
| Shakespeare | 2 | 0 | 0 | 3 | 1 | 2 | 1 | 0 | 2 | 0 | 1 | 0 | 2 | 1 |

64 = rows 1–10; 66 = rows 11–22; 68 = R1–R6; 70 = TE1–TE4, TI1–TI4

*FIG. 4b*

Input Monolingual Query
and Keyboard Weights 200

| theatre | comedy |
|---------|--------|
| 1 | 1 |

Direct Document Hits 202

| Rank | ID | Keyword Content |
|------|----|-----------------|
| 0.329 | E3 | comedy playwright Thames theatre |
| 0.329 | E4 | comedy playwright Thames theatre |
| 0.271 | E1 | comedy Tempest playwright gate Shakespeare theatre |
| 0.189 | E2 | comedy Tempest London Shakespeare theatre |
| 0.126 | E10 | comedy Tempest playwright London Agincourt theatre |
| 0.05 | F9 | dramaturge Londres mer theatre |
| 0.023 | F10 | Tempete dramaturge Londres Tamise theatre |
| 0.006 | E5 | London Thames tea bridge theatre |

Latent Document Hits 204

| Rank | ID | Keyword Content |
|------|----|-----------------|
| 0.201 | I7 | commedia teatro Tempesta drammaturgo Tamigi Tragediografo rappresentazione |
| 0.168 | I1 | commedia teatro Tempesta drammaturgo Shakespeare Agincourt |
| 0.161 | I10 | commedia teatro drammaturgo Londra Tamigi Shakespeare |
| 0.16 | I3 | commedia teatro Tempesta drammaturgo Londra Tamigi Rappresentazione Shakespeare |
| 0.151 | I4 | commedia teatro drammaturgo Londra rappresentazione |
| 0.099 | F1 | comedie Tempete dramaturge Tamise auteur Shakespeare theatre |
| 0.098 | F2 | comedie Tempete dramaturge Londres Shakespeare Agincourt theatre |
| 0.086 | E8 | Tempest playwright London |
| 0.084 | I2 | commedia teatro Tempesta drammaturgo Londra Tamigi tragediografo Shakespeare |
| 0.08 | I5 | commedia teatro drammaturgo Londra tragediografo Shakespeare |
| 0.065 | F7 | comdie Tempete dramaturge Londres Shakespeare Agincourt theatre |
| 0.043 | I6 | commedia teatro Tempesta drammaturgo Tamigi tragediografo |

Direct Keyword Suggestion and Relative Weights 206

| theatre | teatro | comedy | commedia | comedie |
|---------|--------|--------|----------|---------|
| 1 | 0.486 | 0.384 | 0.326 | 0.266 |

210

Latent Keyword Suggestion and Relative Weights 208

| Shakespeare | playwright | drammaturgo | Tamigi | tragediografo |
|-------------|------------|-------------|--------|---------------|
| 0.251 | 0.127 | 0.121 | 0.045 | 0.044 |

EXTENDED FUNCTIONALITY FOR AN INVERSE INFERENCE ENGINE BASED WEB SEARCH

STATEMENT REGARDING FEDERALLY SPONSORED RESEARCH OR DEVELOPMENT

The development of this invention was supported at least in part by the United States Defense Advanced Research Project Agency (DARPA) in connection with Small Business Innovation Research Contract DAAH01-00-C-R168. Accordingly, the United States Government may have certain rights in the present invention.

BACKGROUND OF THE INVENTION

The present invention relates generally to systems for searching document sets, and more specifically to an advanced system for cross language document retrieval.

Latent Semantic Analysis

Latent Semantic Analysis (LSA) is a promising departure from traditional models. The LSA method attempts to provide intelligent agents with a process of semantic acquisition. Researchers at Bellcore (Deerwester et al., 1990, No. 11 in Appendix A; Berry et al, 1995, No. 5 in Appendix A; Dumais et al, 1991 and 1998, Nos. 11 and 12 in Appendix A) have described a computationally intensive algorithm known as Latent Semantic Indexing (LSI). LSI is an unsupervised classification technique based on a matrix factorization method. Cognitive scientists have-shown that the performance of LSI on multiple-choice vocabulary and domain knowledge tests emulates expert essay evaluations (Foltz et al, 1998, No. 16 in Appendix A; Kintsch, in press, No. 18 in Appendix A; Landauer and Dumais, 1997, No. 20 in Appendix A; Landauer et al., 1997 and 1998, Nos. 22 and 23 in Appendix A; Wolfe et al., 1998, No. 37 in Appendix A). LSI is based on Singular Value Decomposition (SVD). Bartell et al. (1996), No. 3 in Appendix A, have shown that LSI is an optimal special case of multidimensional scaling. The aim of all indexing schemes which are based on multivariate analysis or unsupervised classification methods is to automate the process of clustering and categorizing documents by topic. An expensive precursor was the method of repertory hypergrids, which requires expert rating of knowledge chunks against a number of discriminant traits (Boose, 1985, No. 6 in Appendix A; Waltz and Pollack, 1985, No. 36 in Appendix A; Bernstein et al., 1991, No. 4 in Appendix A; Madigan et al., 1995, No. 24 in Appendix A). While theoretically appealing, this approach has serious limitations. First, it typically takes several hours to index tens of thousands of documents. Additionally, lack of scalability limits the amount of information that is available for semantic learning. This in turn places a serious limitation on the precision of the search. Lack of scalability has also prevented the extension of the LSI technique to cross language semantic analysis, a field in which it holds much promise.

Cross Language Document Retrieval

The Internet is a multilingual universe where travel is limited by the speed of indexing. However, existing search portals do not equalize the accessibility of information across languages. No existing search engine indexes more than 30% of the Web. This results, at least in part, from technological limitations, which have to do with the speed and scalability of existing Web crawling technology, and the availability of network bandwidth. Also, many existing sites cannot maintain up-to-date indices because indexing technology has not been fully integrated with a database management system. Whenever possible, existing Web robots and crawlers limit indexing to pages in the language that is most likely the language of a regional audience. The assumption on which these limitations are based is that user information cannot be matched to requirements for more than one language at a time, and that information in a foreign language is of no interest to a general user. Experiments in monolingual search with foreign language portals point to the segmentation of the Internet space into cultural and linguistic provinces. Accumulating background information in many foreign languages at once is a significant technical challenge. For example, how can a system measure the reaction of the Italian, Greek, Croatian, Russian people to events in nearby Kosovo? Opinions on such a subject are expressed in home pages, articles, editorials and chat rooms in many languages. It would be desirable to weight articles and opinions across languages and isolate the most relevant clusters of information for translation.

Furthermore, any algorithm applied to cross language document retrieval should be scalable to very large information matrices. An effective system could power the first truly international search portal. Multilingual search provided through such a portal could change the overall dynamics and structure of the Internet, upset its cultural imbalance, and open new markets. Today, seventy-five to eighty percent of Web content, including many authority pages, is in English. The great majority of Internet users are from English speaking countries. Many American users are not multilingual, or find it difficult to formulate a query in other languages. The converse is true of many foreign users, even those with an elementary reading knowledge of English. It would therefore be desirable for Web surfers to be able to express queries or examples in the language in which they are most competent, and obtain relevant text passages in any language. Automatic translation engines, referred to as Machine Translators (MT), could then be applied to selectively convert some of this information in the source language. Examples of existing Machine Translators include Babelfish™ as provided by the AltaVista Company, and NeuroTran™ provided by Translation Experts, Ltd. Multilingual search technology could also improve monolingual search in more than one way. The omission of many foreign language pages from the relevant indices destroys the integrity of the link structure of the Web. As a result, for example, the HTML page of a foreign researcher or a foreign institution may never be found, even if it points to a publication in the English language. In addition, multilingual search capabilities could resolve keyword and concept ambiguities across languages.

Existing Approaches

A direct approach to multilingual interrogation is to use existing Machine Translation (MT) systems to automatically translate an entire textual database from every single language into the language of the user. This approach is clearly unrealistic for the Internet, due to the size of the target search space. Moreover, MT syntax errors, and, more significantly, errors in translating concepts make it technically unsuitable for other multilingual database collections in general. A variation on this approach is multilingual interrogation. In multilingual interrogation, the idea is to translate the query from a source language to multiple target languages, for example, using inter-lingual dictionaries and knowledge bases. In addition, translation into different languages must account for the fact that concepts expressed by a single term in one language sometimes are expressed by multiple distinct terms in another. For example, the term "tempo" in Italian corresponds to two different concepts in English: time and weather.

Existing approaches based on creation of inter-lingual pivot concepts require the introduction of keyword tags that can discriminate between word meanings in different languages. This controlled vocabulary approach cannot account for all semantic variations in all languages, and often prohibits precise queries that are not expressed with the authorized keywords. A more data driven approach consists of deducing, during indexing, the keywords that would be supplied for a document from the terms contained in the full-text or summary of the document. Unfortunately, the creation of these directories is time consuming. It can be done either manually by a team of experts, or by an automatic learning process from previously indexed documents. Again, linking different languages requires the introduction of a pivot language.

Still another existing approach consists of combining machine translation methods with information retrieval methods. This approach has been developed by the European ESPRIT consortium in the project EMIR (European Multilingual Information Retrieval) (EMIR, 1994, No. 15 in Appendix A). This system uses three main tools: 1) linguistic processors (morphological and syntactic analysis) which perform grammatical tagging, identify dependency relations and normalize the representation of uniterms and compounds; 2) a statistical model which is used to weight the query-document intersection; 3) a monolingual and multilingual reformulation system whose aim is to infer, from the original natural language query words, all possible expressions of the same concept that can occur in the document, whatever the language. Tests with a trilingual (English, French and German) version of the Cranfield corpus show that multilingual interrogation is 8% better than using MT followed by monolingual interrogation. However, this system has yet to demonstrate scalability and ease of extension to other languages.

The most promising automated-approach to cross language retrieval is an extension of LSI given by Dumais et al. (1996 and 1997, Nos. 13 and 1 in Appendix A) and known as CL-LSI (Cross-Language LSI). In a vector space model, documents for which there exist a translation into multiple languages can be observed in language subspaces. CL-LSI approximates these language subspaces by the usual eigenvector decomposition. By identifying and aligning principal axes for the various languages, the LSI algorithm correlates clusters of documents across the various language subspaces. The alignment is made possible by 1) cross-language homonyms, and 2) the general statistics of term distributions in a reasonably large training collection. Testing on a sample of 2,500 paragraphs from the Canadian Parliament bilingual corpus (the Hensard collection), has demonstrated that cross-language retrieval with LSI is equivalent to monolingual interrogation of a fully translated database.

BRIEF SUMMARY OF THE INVENTION

An inverse inference engine for high performance Web searching is disclosed, which includes a superior method for performing Latent Semantic Analysis, in which the underlying search problem is cast as a Backus-Gilbert (B-G) inverse problem (Press et. al, 1997, No. 32 in Appendix A). Improved efficiency is provided by the inverse inference engine as a result of solving an optimization problem for the distance between a transformed query vector and document clusters directly in a transform space. Semantic bases approximate the query in this transform space. Bases with negative coefficients contain the latent semantic information. The inverse inference engine may be applied to a search tool that returns a list of direct document hits and a list of latent document hits in response to a query. The Inverse Inference approach of the disclosed system is a new approach to Latent Semantic Analysis (LSI), that unlike LSI is fast and scalable, and therefore applicable to the task of cross language semantic analysis.

An extension of the inverse inference engine provides cross language document retrieval in a way that is scalable to very large information matrices. In contrast to previous approaches using cross-language LSI (CL-LSI), the disclosed system for cross language document retrieval uses the much faster inverse inference engine, instead of SVD, to perform matrix reduction. In the disclosed cross-language search extension to the inverse inference engine, the list of direct document hits may contain local language document hits, while the list of latent document hits may contain foreign language document hits. In addition to performing cross language document retrieval, the disclosed search technology also provides automatic tools for-accelerating the construction of a multilingual lexicon, and for extracting terminology from multilingual corpora of texts.

In the disclosed cross language document retrieval system, the information matrix used as input to the inverse inference engine is organized into blocks of rows corresponding to languages within a predetermined set of natural languages. For example, using a predetermined language set consisting of English, French and Italian, an illustrative information matrix would consist of 3 sections of rows, a first of which is associated with English keywords, a second of which is associated with Italian keywords, and a third of which is associated with French keywords. Columns of entries within the first section of rows in the information matrix represent documents in English, columns of entries within the second section of rows represent documents in French, and columns of entries within the third section of rows represent documents in Italian.

The information matrix is further organized column-wise into two main partitions. The first partition is a left-hand side column vector of blocks of entries representing fully translated documents, which may referred to as the "reference documents", or "training set." The second partition is a matrix of blocks of entries representing documents for which translations are not available in all of the predetermined languages, including a number of sets of columns corresponding to the languages in the predetermined language set. Further in the second partition, entries in blocks outside the main diagonal of blocks contain zero values. In other words, those entries in blocks along the main diagonal within the second partition represent the contents of those documents for which full translations are not available, and which make up the target search space.

Another extension to the inverse inference retrieval document retrieval system is disclosed that supports automatic, knowledge based training. This approach generalizes the idea of using a training set, as described in connection with cross language document retrieval, to the problem of searching databases including information that is diluted or not reliable enough to allow the creation of robust semantic links.

BRIEF DESCRIPTION OF THE SEVERAL VIEWS OF THE DRAWING

The invention will be more fully understood by reference to the following detailed description of the invention in conjunction with the drawings, of which:

FIGS. 4a and 4b shows examples information (or term-document) matrices used for cross-language document retrieval;

FIG. 6 illustrates cross language retrieval using an inverse inference engine.

DETAILED DESCRIPTION OF THE INVENTION

Information Retrieval Overview

Figure 1:
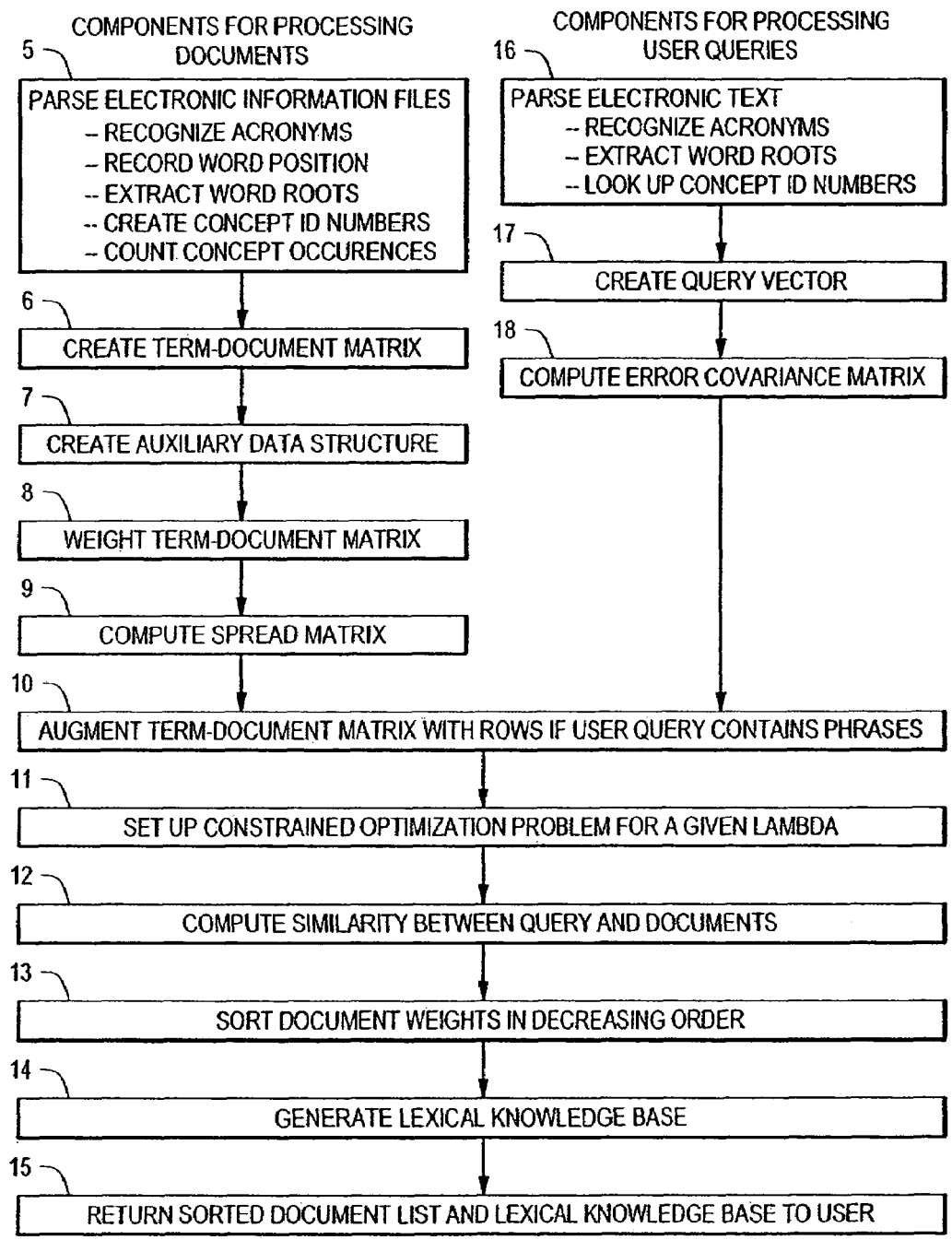
FIG. 1 is a flow chart showing a series of steps for processing documents and processing user queries.

Information retrieval is the process of comparing document content with information need. Currently, most commercially available information retrieval engines are based on two simple but robust metrics: exact matching or the vector space model. In response to an input query, exact-match systems partition the set of documents in the collection into those documents that match the query and those that do not. The logic used in exact-match systems typically involves Boolean operators, and accordingly is very rigid: the presence or absence of a single term in a document is sufficient for retrieval or rejection of that document. In its simplest form, the exact-match model does not incorporate term weights. The exact-match model generally assumes that all documents containing the exact term(s) found in the query are equally useful. Information retrieval researchers have proposed various revisions and extensions to the basic exact-match model. In particular, the "fuzzy-set" retrieval model (Lopresti and Zhou, 1996, No. 40 in Appendix A) introduces term weights so that documents can be ranked in decreasing order relative to the frequency of occurrence of those weighted terms.

The vector space model (Salton et al., 1983, No. 41 in Appendix A) views documents and queries as vectors in a high-dimensional vector space, where each dimension corresponds to a possible document feature. The vector elements may be binary, as in the exact-match model, but they are usually taken to be term weights which assign "importance" values to the terms within the query or document. The term weights are usually normalized. The similarity between a given query and a document to which it is compared is considered to be the distance between the query and document vectors. The cosine similarity measure is used most frequently for this purpose. It is the normal inner product between vector elements:

$$\cos(q, D_i) = \frac{w_q \cdot w_{d_i}}{\|w_q\| \|w_{d_i}\|} = \frac{\sum_{j=1}^{p} w_{q_j} w_{d_{ij}}}{\sqrt{\sum_{j=1}^{p} w_{q_j}^2 \sum_{j=1}^{p} w_{d_{ij}}^2}}$$

where q is the input query, $D_i$ is a column in a term-document matrix, $w_{qj}$ is the weight assigned to term j in the query, $w_{dj}$ is the weight assigned to term j in document i. This similarity function gives a value of 0 when the document and query have no terms in common and a value of 1 when their vectors are identical. The vector space model ranks the documents based on their "closeness" to a query. The disadvantages of the vector space model are the assumed independence of the terms and the lack of a theoretical justification for the use of the cosine metric to measure similarity. Notice, in particular, that the cosine measure is 1 only if $w_{qj}=w_{dj}$. This is very unlikely to happen in any search, however, because of the different meanings that the weights w often assume in the contexts of a query and a document index. In fact, the weights in the document vector are an expression of some statistical measure, like the absolute frequency of occurrence of each term within a document, whereas the weights in the query vector reflect the relative importance of the terms in the query, as perceived by the user.

The Disclosed System for Information Retrieval

As illustrated by the steps shown in FIG. 1, the disclosed system computes a constrained measure of the similarity between a query vector and all documents in a term-document matrix. More specifically, at step 5 of FIG. 1, the disclosed information retrieval system parses a number of electronic information files containing text. In an illustrative embodiment, the parsing of the electronic text at step 5 of FIG. 1 may include recognizing acronyms, recording word positions, and extracting word roots. Moreover, the parsing of step 5 may include processing of tag information associated with HTML and XML files, in the case where any of the electronic information files are in HTML or XML format. The parsing of the electronic information files performed at step 5 may further include generating a number of concept identification numbers (concept IDs) corresponding to respective terms (also referred to as "keywords") to be associated with the rows of the term-document matrix formed at step 6. The disclosed system may also count the occurrences of individual terms in each of the electronic information files at step 5.

At step 6 of FIG. 1, the disclosed system generates a term-document matrix (also referred to as the "information matrix") based on the contents of the electronic document files parsed at step 5. In one embodiment, the value of each cell (or "entry") in the term-document matrix generated at step 6 indicates the number of occurrences of the respective term indicated by the row of the cell, within the respective one of the electronic information files indicated by the column of the cell. Alternatively, the values of the cells in the term-document matrix may reflect the presence or absence of the respective term in the respective electronic information file.

Cross Language Document Retrieval

In the disclosed cross language document retrieval system, the information matrix used as input to the inverse inference engine is as follows:

$$D = \begin{bmatrix} R^E & T^E & 0 & 0 \\ R^F & 0 & T^F & 0 \\ R^I & 0 & 0 & T^I \end{bmatrix} \quad (a)$$

or $$D = \begin{bmatrix} R^E & T^E & 0 \\ R^F & 0 & T^F \end{bmatrix} \quad (b)$$

$$D = \begin{bmatrix} R^E & T^E & 0 \\ R^I & 0 & T^I \end{bmatrix}$$

where the superscripts identify the language of document blocks in the term document matrix. In the above illustrative embodiments (a) and (b), E stands for English, F for French, and I for Italian. The left-hand partition is referred to as the reference partition, and includes blocks (R) of entries representing the contents of reference documents. In the embodiment (a) shown above, a single matrix is used, and the reference documents (R) are documents for which there is a translation in every language of a predetermined set of languages. However, in practice it may be easier to find bilingual translations than trilingual translations. Accordingly, as shown above in the alternative embodiment (b), the term document matrix may be split into multiple matrices in which the reference documents used are those for which a translation is available from a first language in the set languages to a second language in the set of languages set. Accordingly, separate matrices linking English to French and English to Italian are used in embodiment (b) above, and the reference documents or translations linking English to French may be different from the reference documents or translations linking English to Italian.

The predetermined language set in examples (a) and (b) above includes English, French and Italian. The right-hand partition in each matrix includes blocks (T) of entries representing the contents of documents to be searched. In the right-hand partition, the diagonal blocks (T) include entries representing the contents of all "target" multilingual documents to be searched.

When embodiment (a) above is used as the term document matrix, a single trilingual search is performed across the single matrix. When embodiment (b) above is used as the term document matrix, two bilingual searches are performed. The first bilingual search is performed from English to French using the top matrix, which represents the contents of those reference documents available in both English and French, as well as target documents in English and French for which translations between English and French are not available. The second bilingual search is performed from English to Italian using the bottom matrix, which represents the contents of those reference documents available in both English and Italian, as well as target documents in Italian and English for which translations between English and Italian are not available.

With respect to the relative sizes of the R blocks and the T blocks, in the case where the R blocks are relatively large with respect to T blocks, searching by the disclosed system using the information matrix would potentially yield relatively more accurate results. In the case where the R blocks are relatively small with respect to the T blocks, searching by the disclosed system using the information matrix would potentially be performed more quickly, but without the gains in accuracy obtained in the case where the R blocks are relatively larger than the T blocks. Accordingly, making the R blocks as large as possible may be done in order to optimize search accuracy, while making R blocks smaller may optimize performance in terms of search time. The R blocks may also be referred to as the full translation blocks or training corpus. The search space over which the information matrix is compiled is application specific and/or user specified.

The T blocks of the term document matrix are not necessarily equal in size. In particular, the number of columns in each T block reflects the number of target documents in the associated language. Also, the number of rows in each block need not be equal, since the number of rows in each block may reflect in part the flexibility of the translation of keywords between languages.

While in the illustrative embodiment, the documents represented by the R blocks are described as full translations, this is not a requirement of the disclosed system. Alternatively, corresponding documents represented by the information matrix entries in the R blocks may be equivalent across the relevant languages in that they cover common topics. In other words, while documents sharing a single column of the R blocks need not be exact translations, they do need to be equivalent in terms of covering the same topics in the respective different languages. For example, multiple news articles describing the same event, such as an election, may be written in different languages by different authors. Such semantically related articles, in which a common topic is being discussed, may be considered translations for purposes of the R blocks in the information matrix.

In an illustrative embodiment of the disclosed system, cross language retrieval is accomplished by extending an English term document matrix to French and Italian. In this example of the disclosed system, the extended term document matrix consisted of a left hand side "reference" partition representing the trilingual translation of the previously employed English keywords for the previous set of target documents. The right hand side or "target" partition of the term document matrix represented the contents of three sets of unrelated documents in each of the three languages in the predetermined language set: English, French, and Italian. The translation used for the English keywords was, for example, a "noisy" translation, allowing for semantic ambiguities and preferences that may result when translating across languages. For instance, Tempest in English may be split into both Tempête and orage in French; playwright in English may be split into both tragediografo and drammaturgo in Italian. On the other hand, the keyword theatre has the same spelling in English and French. In the illustrative embodiment, the inverse inference algorithm was applied to the multilingual term document matrix, and searching performed only on the target documents.

Automatic Knowledge Based Training

In another illustrative embodiment of the disclosed system, the training set approach for cross language retrieval is applied to the problem of searching databases where information is diluted or not reliable enough to allow the creation of robust semantic links. This embodiment could be used to provide an application for searching financial chat rooms or message boards. The application would index and accumulate information from multiple chat rooms on a hourly basis. In addition to searching historical or current databases, a search agent would attempt to convert information that is present in a descriptive form into a quantitative or symbolic form, and provide a sentiment indicator by aligning investor opinions about a stock along some predefined semantic axes. The application also is capable of detecting participants who are trying to manipulate investor's opinions. The need for such an application is predicated on the fact that the information in the message boards or chat rooms alone is not robust or reliable enough to support intelligent information retrieval. In this embodiment of the disclosed system, the left partition of the term document matrix is loaded with a large amount of concurrent financial news from reliable sources. The information matrix accordingly is as follows:

$$D=[D^R|D^S]$$

where the superscripts R and S stand respectively for reference and search document sets. Retrieval is performed on the S document set only. The R set is invisible to the user, but it is where most of the reliable semantic links for the search in S are established. This system for knowledge based training is inexpensive, since it requires no expert intervention and can be quickly tailored to many different domains. Further, in vertical search applications, the performance of latent semantic searching can be improved by loading the left partition of the term document matrix with domain specific content. For example, the set of training documents could consist of all the articles in the Encarta encyclopedia. The disclosed system would then operate to establish powerful semantic connections based on this reference material, and use such semantic connections to search whatever collection of new documents $D^S$ the user wants to search.

Now again with reference to FIG. 1, at step 7, the disclosed system generates an auxiliary data structure associated with the previously generated concept identification numbers. The elements of the auxiliary data structure generated during step 7 are used to store the relative positions of each term of the term-document matrix within the electronic information files in which the term occurs. Additionally, the auxiliary data structure may be used to store the relative positions of tag information from the electronic information files, such as date information, that may be contained in the headers of any HTML and XML files.

Weighting of the term-document matrix formed at step 6 may be performed as illustrated at step 8 of FIG. 1. Weighting of the elements of the term-document matrix performed at step 8 may reflect absolute term frequency count, or any of several other measures of term distributions that combine local weighting of a matrix element with a global entropy weight for a term across the document collection, such as inverse document frequency.

At step 9 of FIG. 1, the disclosed system generates, in response to the term-document matrix generated at step 6, a term-spread matrix. The term-spread matrix generated at step 9 is a weighted autocorrelation of the term-document matrix generated at step 6, indicating the amount of variation in term usage, for each term, across the set of electronic information files. The term-spread matrix generated at step 9 is also indicative of the extent to which the terms in the electronic information files are correlated.

At step 16, the disclosed system receives a user query from a user, consisting of a list of keywords or phrases. The disclosed system parses the electronic text included in the received user query at step 16. The parsing of the electronic text performed at step 16 may include, for example, recognizing acronyms, extracting word roots, and looking up those previously generated concept ID numbers corresponding to individual terms in the query. In step 17, in response to the user query received in step 16, the disclosed system generates a user query vector having as many elements as the number of rows in the term-spread matrix generated at step 9.

Following creation of the query vector at step 17, at step 18 the disclosed system generates, in response to the user query vector, an error-covariance matrix. The error-covariance matrix generated at step 18 reflects an expected degree of uncertainty in the initial choice of terms by the user, and contained within the user query.

At step 10, in the event that the user query includes at least one phrase, the disclosed system augments the term-document matrix with an additional row for each phrase included in the user query. For purposes herein, a "phrase" is considered to be a contiguous sequence of terms. Specifically, at step 10, for each phrase in the user query, the disclosed system adds a new row to the term-document matrix, where each cell in the new row contains the frequency of occurrence of the phrase within the respective electronic information file, as determined by the frequencies of occurrence of individual terms composing the phrase and the proximity of such concepts, as determined by their relative positions in the electronic information files, as indicated by the elements of the auxiliary data structure. In this way the auxiliary data structure permits reforming of the term-document matrix to include rows corresponding to phrases in the user query for the purposes of processing that query. Rows added to the term-document matrix for handling of phrases in a user query are removed after the user query has been processed.

Following step 10, at step 11, the disclosed system formulates, in response to the term spread matrix, error covariance matrix, and user query vector, a constrained optimization problem. The choice of a lambda value for the constrained optimization problem set up in step 11 is a Lagrange multiplier, and its specific value determines a trade-off between the degree of fit and the stability of all possible solutions to the constrained optimization problem.

At step 12 of FIG. 1, the disclosed system computes the similarity between each of the electronic information files and the user query by solving the constrained optimization problem formulated in step 11. Specifically, in an illustrative embodiment, the disclosed system generates a solution vector consisting of a plurality of solution weights ("document weights"). The document weights in the solution vector each correspond to a respective one of the electronic information files, and reflect the degree of correlation of the user query to the respective electronic information file. At step 13, the disclosed system sorts the document weights based on a predetermined ordering, such as in decreasing order of similarity to the user query.

At step 14, the disclosed system automatically builds a lexical knowledge base responsive to the solution of the constrained optimization problem computed at step 12. Specifically, at step 14, the original term-document matrix created at step 6 and potentially weighted at step 8, rather than the term spread matrix computed at step 9, is cross-multiplied with the unsorted document weights generated at step 12 (note that the document weights must be unsorted in this step to match the original order of columns in the term-document matrix) to form a plurality of term weights, one for each term. These term weights reflect the degree of correlation of the terms in the lexical knowledge base to the terms in the user query.

At step 15, the disclosed system returns a list of documents corresponding to the sorted document weights generated at step 13, and the lexical knowledge base generated at step 14, to the user. In the disclosed system for cross-language document retrieval, the document weights can be positive or negative. The positive weights are relevance scores for the source language documents (for example English), while the negative weights are relevance scores for the target language documents (for example French or Italian). Accordingly, in the list of documents returned at step 15, the illustrative embodiment of the disclosed system splits the returned documents by sign, and sorts them in decreasing order by absolute value (e.g. positive weighted documents 0.997, 0.912, 0.843, etc., followed by negative weighted documents −0.897, −0.765, −0.564, etc.).

Figure 2:
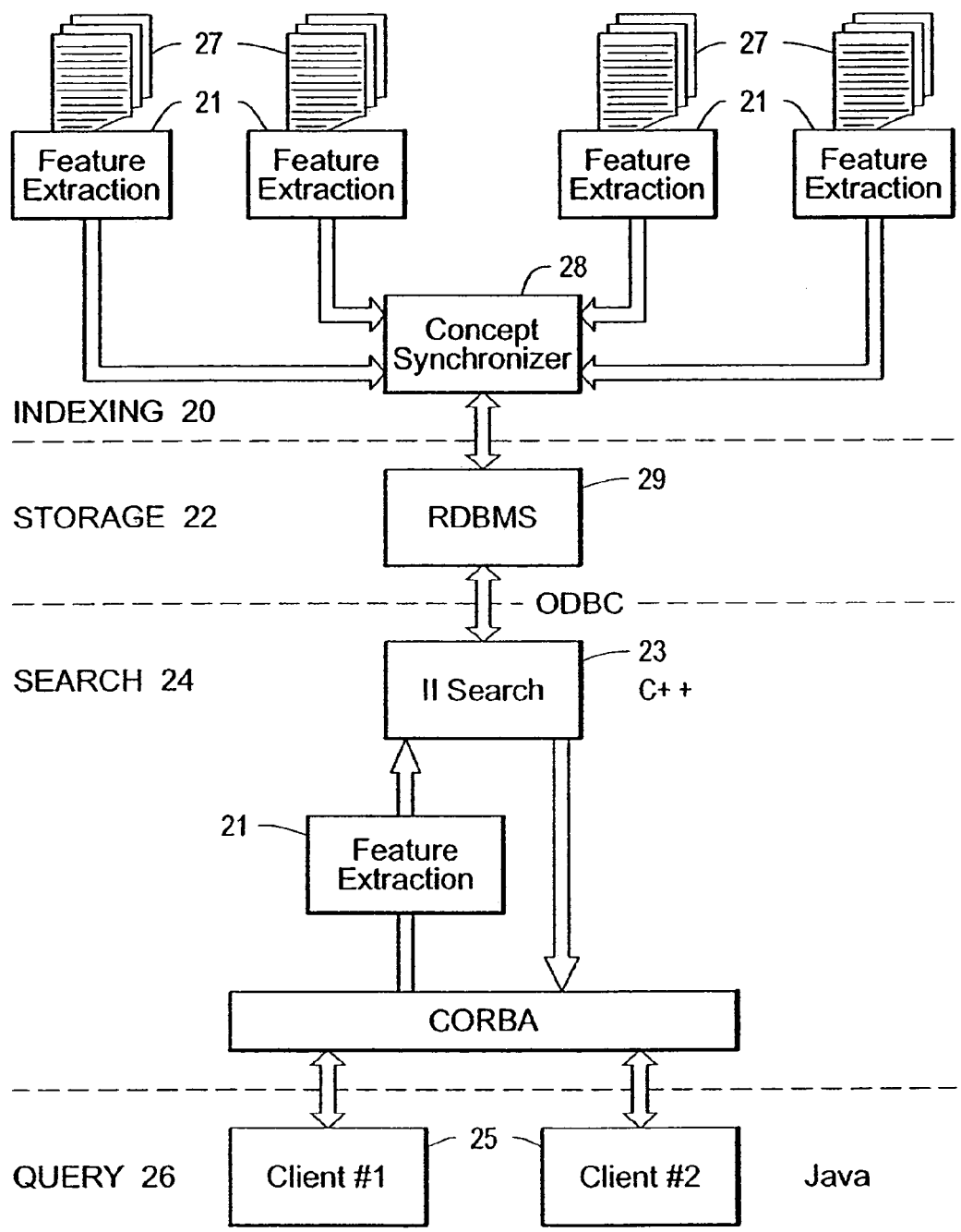
FIG. 2 shows an architectural view of components in an illustrative embodiment.

Overall System Architecture of an Illustrative Embodiment of the Disclosed System for Information Retrieval FIG. 2 shows the overall architecture of the distributed information retrieval system. The system consists of four modules: Indexing 20, Storage 22, Search 24, and Query 26. The modules may run in different address spaces on one computer or on different computers that are linked via a network using CORBA (Common Object Request Broker Architecture). Within this distributed object framework, each server is wrapped as a distributed object which can be accessed by remote clients via method invocations. Multiple instances of the feature extraction modules 21 can run in parallel on different machines, and database storage can be spread across multiple platforms.

The disclosed system may be highly modularized, thus allowing a variety of configurations and embodiments. For example, the feature extraction modules 21 in the indexing module 20 may be run on inexpensive parallel systems of machines, like Beowulf clusters of Celeron PCs, and Clusters of Workstations (COW) technology consisting of dual processor SUN Ultra 60 systems. In one embodiment, the entire architecture of FIG. 2 may be deployed across an Intranet, with the "inverse inference" search engine 23 residing on a Sun Ultra 60 server and multiple GUI clients 25 on Unix and Windows platforms. Alternatively, the disclosed system may be deployed entirely on a laptop computer executing the Windows operating system of Microsoft Corporation.

Further as illustrated in FIG. 2, the indexing module 20 performs steps to reduce the original documents 27 and a query received from one of the clients 21 into symbolic form (i.e. a term-document matrix and a query vector, respectively). The steps performed by the indexing module 20 can be run in batch mode (when indexing a large collection of documents for the first time or updating the indices) or on-line (when processing query tokens). The disclosed architecture allows extensibility of the indexing module 20 to media other than electronic text.

The storage module 22 shown in FIG. 2 includes a Relational DataBase Management System (RDBMS) 29, for storing the term-document matrix. A search engine module 23 implements the presently disclosed inverse inference search technique. These functions provide infrastructures to search, cluster data, and establish conceptual links across the entire document database.

Client GUIs (Graphical User Interfaces) 25 permits users to pose queries, browse query results, and inspect documents. In an illustrative embodiment, GUI components may be written in the Java programming language provided by Sun Microsystems, using the standard JDK 1.1 and accompanying Swing Set. Various visual interface modules may be employed in connection with the GUI clients 25, for example executing in connection with the Sun Solaris operating system of Sun Microsystems, or in connection with the Windows NT, Windows 95, or Windows 98 operating systems of Microsoft Corporation.

Indexing

Figure 3:
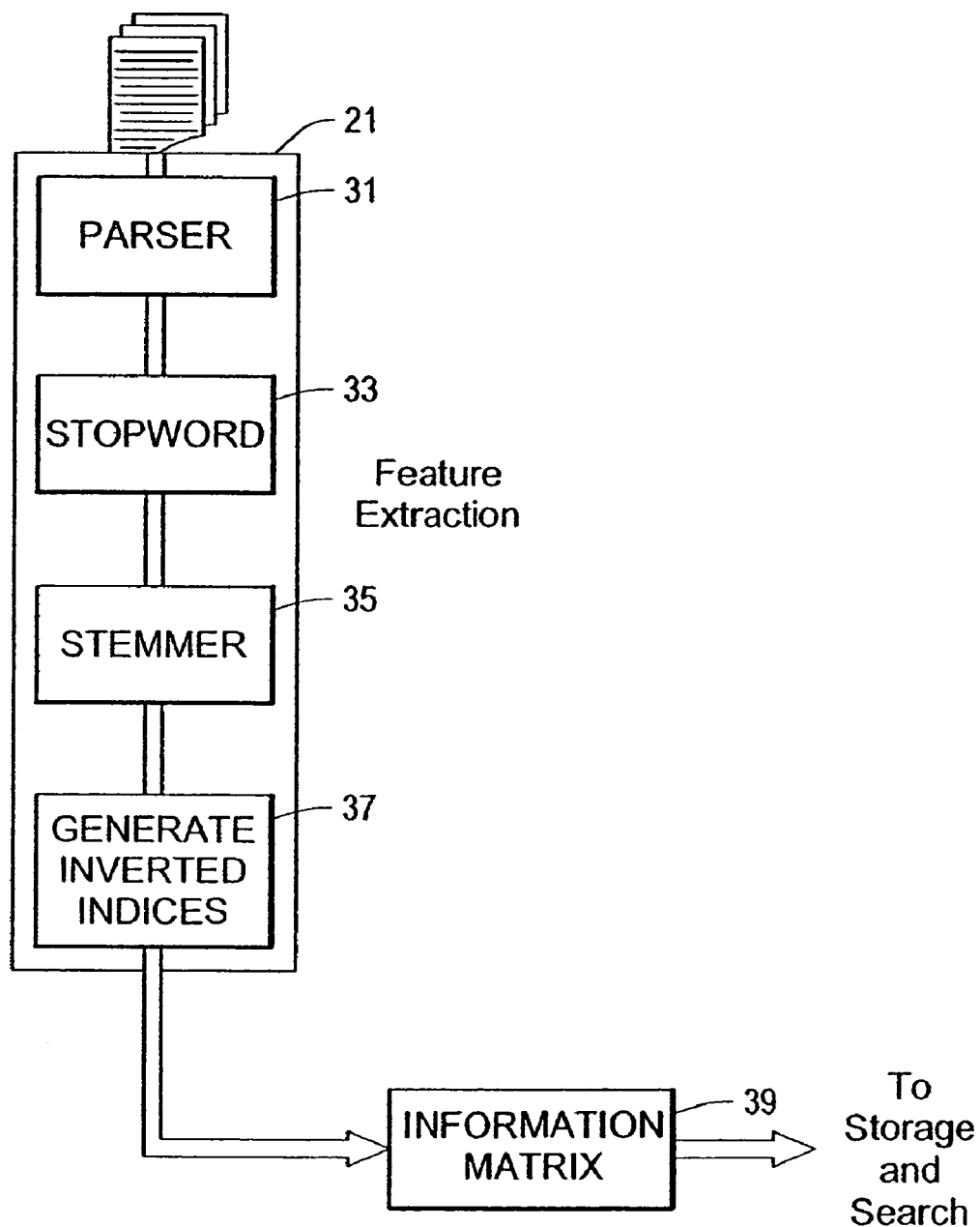
FIG. 3 shows steps performed during feature extraction and information matrix (term-document matrix) formation.

As shown in FIG. 3, a feature extraction module 21 comprises a parser module 31, a stopwording module 33, a stemming module 35, and a module for generating inverted indices 37. The output of the indexing process using the feature extraction module 21 includes a number of inverted files (Hartman et al, 1992, No. 38 in. Appendix A), shown as the "term-document" or "information" matrix 39. The parser 31 removes punctuation and records relative word order. In addition, the parser 31 employs a set of rules to detect acronyms before they go through the stopword 33 and stemmer 35 modules. The parser 31 can also recognize specific HTML, SGML and XML tags. The stopword 33 uses a list of non-diagnostic English terms. For purposes of example, the stemmer 35 is based on the Porter algorithm (described in Hartman et al, 1992, No. 38 in Appendix A). Those skilled in the art should recognize that alternative embodiments of the disclosed system may employ stemming methods based on successor variety. The feature extraction module provides functions 37 that generate the inverted indices by transposing individual document statistics into a term-document matrix 39.

The indexing performed in the embodiment shown in FIG. 3 also supports indexing of document attributes. Examples of document attributes are HTML, SGML or XML document tags, like date, author, source. Each document attribute is allocated a private row for entry in the term-document matrix. As noted above, weighting of the elements of the term-document matrix 39 may reflect absolute term frequency count, binary count, or any of several other measures of term distributions that combine local weighting of a matrix element with a global entropy weight for a term across the document collection, such as inverse document frequency. In an illustrative embodiment, high precision recall results are obtained with the following weighting scheme for an element $d_{ik}$ of the term-document matrix:

$$W_{ik} = \frac{tf_{ik} \cdot idf_k}{\sqrt{\sum_{k=1}^{n}(tf_{ik})^2(idf_k)^2}} \quad \text{where} \quad idf_k = \log\left(\frac{N}{n_k}\right)$$

$tf_{ik}$ is the frequency of term k in a document i, while the inverse document frequency of a term, $idf_k$, is the log of the ratio of the total number of documents in the collection to the number of documents containing that term. As shown above, $w_{ik}$ is the weighting applied to the value in cell ik of the term-document matrix. The effect of these weightings is to normalize the statistics of term frequency counts. This step weights the term frequency counts according to: 1) the length of the document in which the term occurs and 2) how common the term is across documents. To illustrate the significance of this weighting step with regard to document length, consider a term equal to the word "Clinton". An electronic text document that is a 300 page thesis on Cuban-American relationships may, for example, have 35 counts of this term, while a 2 page biographical article on Bill Clinton may have 15 counts. Normalizing keyword counts by the total number of words in a document prevents the 300 pages thesis to be prioritized over the biographical article for the user query "Bill Clinton". To illustrate the significance of this weighting step with regard to commonness of certain terms, consider the terms "the" and "astronaut". The former term likely occurs in 1000 documents out of 1000; the latter term may occur in 3 documents out of 1000. The weighting step prevents over-emphasis of terms that have a high probability of occurring everywhere.

Storage

As previously mentioned, the storage module 22 of FIG. 2 includes a Relational DataBase Management System (RDBMS) 29 for storing the information matrix 39 (also referred to as the "term-document" matrix) output by the indexing module 20. In a preferred embodiment, the interface between the RDBMS and the Indexing and Search modules complies with OBDC standards, making the storage module vendor independent. In one embodiment, the Enterprise Edition of Oracle 8.1.5 on Sun Solaris may be employed. However, those skilled in the art will recognize that a database management system is not an essential component of the disclosed invention. For example, in another embodiment a file system may be employed for this purpose, instead of a RDBMS.

The concept synchronizer 28 is used by a parallelized implementation of the indexing module. In such an implementation, at indexing time, multiple processors parse and index electronic text files in parallel. The concept synchronizer 28 maintains a look up table of concept identification numbers, so that when one processor encounters a keyword which has already been assigned a concept identification number by another processor, the same concept identification number is used, instead of creating a new one. In this way, the concept synchronizer 28 prevents having more than one row for the same term in the term-document matrix.

Search

The search engine 23 is based on a data driven inductive learning model, of which LSI is an example (Berry et al, 1995, No. 5 in Appendix A; Landauer and Dumais, 1997. No. 20 in Appendix A). Within this class of models, the disclosed system provides distinct advantages with regard to: 1) mathematical procedure; 2) precision of the search; 3) speed of computations and 4) scalability to large information matrices. The disclosed system attempts to overcome the problems of existing systems related to synonymy and polysemy using a data driven approach. In other words, instead of using a lexical knowledge base built manually by experts, the disclosed system builds one automatically from the observed statistical distribution of terms and word co-occurrences in the document database.

FIG. 4*a* shows an example of a term-document matrix 40, used for cross-language document retrieval in the disclosed system. The term-document matrix 40 illustrates the embodiment of the disclosed system in which a single matrix is used, and the reference documents (R) are documents for which there is a translation in every language of a predetermined set of languages. Accordingly, the reference documents in the example of FIG. 4*a* are shown as R1, R2, R3, R4, R5 and R6. The term-document matrix 40 of FIG. 4*a* consists, for example, of elements storing values representing absolute keyword frequencies. Term-document matrix 40 is shown including a set of rows 42 for English keywords, a set of rows 44 for French keywords, and a set of rows 46 for Italian keywords. The term-document matrix 40 is further shown including a set of columns 48 describing the contents of the reference documents. Each column in the set of columns 48 describes the contents of a document for which there exists translations in each of the predetermined language set, in this case English, French and Italian. The translations used within a single column need not be literal translations, but must at least share semantic content. Accordingly, the contents of the English version of reference document R1 are reflected in the values of column R1 in the set of rows 42, the contents of the French version of the reference document R1 are reflected in the values of column R1 in the set of rows 44, and the contents of the Italian version of the reference document R1 are reflected in the values of column R1 in the set of rows 46.

The term-document matrix 40 is further shown including a set of columns 50 describing the contents of a number of target documents. The columns TE1, TE2, TE3, and TE4 represent the contents of English language target documents, the columns TF1, TF2, and TF3 represent the contents of French language target documents, and the columns TI1, TI2, TI3 and TI4 represent the contents of Italian language target documents. For example, the target documents are those documents for which translations are not available in all of the languages in the predetermined set of languages. Accordingly, the column TE1 describes the contents of the target document TE1, the column TE2, describes the contents of the target document TE2, and so on. The keywords present in a given target document are those keywords in the language in which that target document is written. Therefore, the matrix elements for a given one of the rows 50 are zero outside of the set of rows for the language of the specific target document. Specifically, the matrix element values of columns TE1, TE2, TE3, and TE4 are zero outside of the set of rows 42, the matrix element values of columns TF1, TF2, and TF3 are zero outside of the set of rows 44, and the matrix element values of columns TI1, TI2, TI3 and TI4 are zero outside of the set of rows 46. Non-zero matrix element values for keywords in languages other than the source language of a given document may reflect the presence of language invariant keywords. In the example of FIG. 4*a*, the keyword Shakespeare illustrates such a language invariant keyword.

It will be noted that the reference document keyword content results in translations of keywords' being present in each of the sets of rows 42, 44 and 46. However, the target documents may include keywords not found in the reference documents. In such a case, the keyword content of the target documents would result in one or more keywords existing in only one of the languages in the predetermined set of languages, without translation to the other languages. For example, the terms "sail", "cuir" and "torre" in the term-document matrix of FIG. 4*a* are additional terms not present in the reference documents.

FIG. 4*b* shows two term document matrices, illustrating the embodiment of the disclosed system in which multiple matrices are used, where the reference documents (R) for a given one of the matrices are documents for which versions are available in only two of the languages in the predetermined set of languages. Thus, using the matrices of FIG. 4*b*, multiple bilingual searches are performed.

The term-document matrix 52 of FIG. 4*b* is shown including a set of rows 56 for English keywords, and a set of rows 58 for French keywords. The matrix 52 further is shown including a set of columns 60 describing the contents of reference documents R1, R2, R3, R4, R5 and R6. The set of columns 62 in matrix 52 describes the contents of English target documents TE1, TE2, TE3 and TE4, as well as French documents TF1, TF2 and TF3. The matrix 54 is shown including a set of rows 64 for English keywords, and a set of rows 66 for Italian keywords. The matrix 54 further includes columns 68 for the contents of the reference documents R1, R2, R3, R4, R5 and R6. The columns 70 describe the contents of the English target documents TE1, TE2, TE3, and TE4, and the contents of the Italian target documents TI1, TI2, TI3 and TI4.

LSI and Matrix Decomposition

LSI assumes that there is some underlying or latent structure in term usage. This structure is partially obscured through variability in the individual term attributes which are extracted from a document or used in the query. A truncated singular value decomposition (SVD) is used to estimate the structure in word usage across documents. Following Berry et al (1995), No. 5 in Appendix A, let D be a m×n term-document or information matrix with m>n, where each element $d^{ij}$ is some statistical indicator (binary, term frequency or Inverse Document Frequency (IDF) weights—more complex statistical measures of term distribution could be supported) of the occurrence of term i in a particular document j, and let q be the input query. LSI approximates D as $$D' = U_k \Lambda_k V_k^T$$

where $\Lambda = \text{diag}(\lambda_1, \ldots, \lambda_k)$, and $\{\lambda_i, i=1,k\}$ are the first k ordered singular values of D, and the columns of $U_k$ and $V_k$ are the first k orthonormal eigenvectors associated with $DD^T$ and $D^TD$ respectively. The weighted left orthogonal matrix provides a transform operator for both documents (columns of D') and q:

$$V_k^T = (\Lambda^{-1} U^T)_k D'$$

$$\alpha = (\Lambda^{-1} U^T)_k q \tag{1}$$

The cosine metric is then employed to measure the similarity between the transformed query $\alpha$ and the transformed document vectors (rows of $V_k$) in the reduced k-dimensional space.

The SVD employed by the LSI technique of equation (1) above provides a special solution to the overdetermined decomposition problem $$D = \Psi A$$

$$q = \Psi \alpha$$

where D is an m×n term-document matrix, q is a query vector with m elements; the set of basis functions $\Psi$ is m×k and its columns are a dictionary of basis functions $\{\Psi_j, j=1, 2, \ldots, k<n\}$; A and $\alpha$ are a k×n matrix and k-length vector of transform coefficients, respectively. The columns of A are document transforms, whereas $\alpha$ is the query transform. Ranking a document against a query is a matter of comparing $\alpha$ and the corresponding column of A in a reduced transform space spanned by $\Psi$. The decomposition of an overdetermined system is not unique. Nonuniqueness provides the possibility of adaptation, i.e. of choosing among the many representations, or transform spaces, one of which is more suited for the purposes of the disclosed system.

LSI transforms the matrix D as $D' = U_k \Lambda_k V_k^T$ where $\Lambda = \text{diag}(\lambda_1, \ldots, \lambda_k)$, and $\{\lambda_i, i=1,k\}$ are the first k ordered singular values of D, and the columns of $U_k$ and $V_k$ are the first k orthonormal eigenvectors associated with $DD^T$ and $D^TD$ respectively. From this we see that $\Psi = (U\Lambda)_k$ and $A = V^{kT}\{A_j, j=1,2, \ldots, n\}$. The columns of A are a set of norm preserving, orthonormal basis functions. If we use the cosine metric to measure the distance between the transformed documents and query, we can show that as k→n $$\cos(A_j, \alpha) = \frac{A_j^T \cdot \alpha}{\|A_j^T\| \|\alpha\|} \approx \frac{w}{\|w\|}$$

where $w = A^T \alpha$ is the smallest $l_2$ norm solution to the linear system Dw=q. Reducing the number of eigenvectors in the approximation to the inverse of D has a regularizing effect on the solution vector w, since it reduces its norm.

The present invention is based on the recognition that the measurement of the distance between the transformed documents and query, as stated above is a special solution to the more general optimization problem $$\min \|f(w)\|_n \text{ subject to } Dw = q \tag{2}$$

where $\|f(w)\|_n$ is a functional which quantifies some property of the solution vector w, n is the order of the desired norm, D is the term-document matrix and q is a query vector. The spectral expansion techniques of linear inverse theory (Parker, 1977, No. 28 in Appendix A; Backus, 1970, No. 1 in Appendix A), wavelet decomposition and atomic decomposition by basis pursuit (Chen et al, 1996, No. 7 in Appendix A) and wavelet packets (Wickerhauser, 1994, No. 39 in Appendix A) provide a number of computationally efficient methods for decomposing an overdetermined system into an optimal superposition of dictionary elements.

The disclosed search engine includes an application of the Backus and Gilbert inversion method to the solution of equation (2) above.

The Inverse Inference Approach of the Disclosed System

Inverse theory departs from the multivariate analysis approach implied by LSI by modeling the information retrieval process as the impulse response of a linear system. This approach provides a powerful mechanism for control and feedback of the information process. With reference to Press et al (1997), No. 32 in Appendix A, the inverse problem is defined by the Fredholm integral equation:

$$c_i = s_i + n_i = \int r_i(x) w(x) dx + n_i$$

where $c_i$ is a noisy and imprecise datum, consisting of a signal $s_i$ and noise $n_i$; $r_i$ is a linear response kernel, and w(x) is a model about which information is to be determined. In the disclosed approach to information retrieval, the above integral equation translates as $$q_i = q''_i + n_i = \int D_i(x) w(x) dx + n_i \tag{3}$$

where $q_i$, an element in the query datum, is one of an imprecise collection of terms and term weights input by the user, $q''_i$ is the best choice of terms and term weights that the user could have input to retrieve the documents that are most relevant to a given search, and $n_i$ is the difference between the user's choice and such an ideal set of input terms and term weights. A statistical measure of term distribution across the document collection, $D_i(x)$, describes the system response. The subscript i is the term number; x is the document dimension (or document number, when 3 is discretized). The statistical measure of term distribution may be simple binary, frequency, or inverse document frequency indices, or more refined statistical indices. Finally, in the present context, the model is an unknown document distance w(x) that satisfies the query datum in a semantic transform space. Equation (3) above is also referred to as the forward model equation.

The solution to equation (3) in non-unique. The optimization principle illustrated by equation (2) above considers two positive functionals of w, one of which, B[w], quantifies a property of the solution, while the other, A[w], quantifies the degree of fit to the input data. The present system operates to minimize A[w] subject to the constraint that B[w] has some particular value, by the method of Lagrange multipliers:

$$\min A[w] + \lambda B[w] \text{ or } \frac{\partial}{\partial w}\{A[w] + \lambda B[w]\} = 0 \quad (4)$$

where $\lambda$ is a Lagrange multiplier. The Backus-Gilbert method "differs from other regularization methods in the nature of its functionals A and B." (Press et al, 1997, No. 32 in Appendix A). These functionals maximize both the stability (B) and the resolving power (A) of the solution. An additional distinguishing feature is that, unlike what happens in conventional methods, the choice of the constant $\lambda$ which determines the relative weighting of A versus B can easily be made before any actual data is processed.

Implementation of an Illustrative Embodiment the Inverse Inference Engine

The following description of an illustrative embodiment of the disclosed system is made with reference to the concise treatment of Backus and Gilbert inversion found in Press et al. (1997), No. 32 in Appendix A. The measurement of a document-query distance $w_c$ is performed by an illustrative embodiment in a semantic transform space. This semantic transform space is defined by a set of inverse response kernels $T_i(x)$, such that $$w_c(x) = \sum_i T_i(x) q_i \quad (5)$$

Here the document-query distances $w_c$ appear as a linear combination of transformed documents $T_i(x)$ and the terms in input query $q_i$, where i is the term number. The inverse response kernels reverse the relationship established by the linear response kernels $D_i(x)$ in the forward model equation (3). In this particular embodiment, the $D_i(x)$'s are binary, frequency, or inverse document frequency distributions. The integral of each term distribution $D_i(x)$ is defined in the illustrative embodiment as $$H_i = \int D_i(x) dx$$

In finding a solution to equation (3), the disclosed system considers two functionals as in equation (4) above. As before, the functional $B[w]=Var[w_c]$ quantifies the stability of the solution. The functional A[w], on the other hand, measures the fit of the solution. The degree of fit is measured as the expected deviation of a computed solution $w_c$ from the true w. The true w gives the ideal choice of query keywords q", when substituted into the forward model equation (3). The relationship between a point estimate of $w_c$ and w can be written as $$w_c(w) = \int \delta(x,x') w(x') dx'$$

where $\delta$ is a resolution kernel, whose width or spread is minimized by the disclosed system in order to maximize the resolving power of the solution. If we substitute equation (5) into equation (3) we arrive at an explicit expression for the resolution kernel $\delta$ $$\delta(x, x') = \sum_i T_i(x) D_i(x')$$

The Backus and Gilbert method chooses to minimize the second moment of the width or spread of $\delta$ at each value of x, while requiring it to have unit area.

These mathematical preambles lead to the following expressions for the functionals A and B:

$$A = \int (x'-x)^2 \delta(x,x')^2 dx' = T(x) \cdot \Gamma(x) \cdot T(x)$$

$$B = \text{var}[w_c] = T(x) \cdot S \cdot T(x)$$

where $\Gamma_{ij} = \int (x'-x)^2 D_i(x') D_j(x') dx'$ is the spread matrix, and $S_{ij}$ is the covariance matrix of the errors $n_i$ in the input query vector, computed as $S_{ij} = \text{Covar}[n_i, n_j] = \delta_{ij} n_i^2$, if we assume that the errors $n_i$ on the elements of the input query are independent. By allowing for errors in the input query vector, which is based on the terms in the original query, the present system attaches a margin of uncertainty to the initial choice of terms input by the user. Since the user's initial term selection may not be optimal, the present system advantageously allows for a margin of error or a certain degree of flexibility in this regard.

The optimization problem can therefore be rewritten as $$\min_w A[w] + \lambda B[w] = T(x) \cdot [\Gamma(x) + \lambda S] \cdot T(x) \text{ subject to } T(x) \cdot H = 1 \quad (6)$$

where $\lambda$ is a Lagrange multiplier. The constraint follows from the requirement that the resolution kernel $\delta$ has unit area. Solving for T(x) we have an explicit expression for the document transform performed by the present system:

$$T(x) = \frac{[\Gamma(x) + \lambda S]^{-1} \cdot H}{H \cdot [\Gamma(x) + \lambda S]^{-1} \cdot H}$$

Substituting into (5), we have an expression for the distance between documents and the query q, as performed by the disclosed system:

$$w_c(x) = \frac{q \cdot [\Gamma(x) + \lambda S]^{-1} \cdot H}{H \cdot [\Gamma(x) + \lambda S]^{-1} \cdot H} \quad (7)$$

Note that there is no need to compute the inverse of the matrix $[\Gamma(x)+\lambda S]^{-1}$ explicitly. Instead, the present system solves for some intermediate vector y in the linear system $[\Gamma(x)+\lambda S] \cdot y = H$, and substitutes y for $[\Gamma(x)+\lambda S]^{-1} \cdot H$ in (7). A property of the matrix $\Gamma$ which plays to the advantage of the disclosed system is that it is sparse. The particular computational method used in the vector solution of equation (7) by an illustrative embodiment is LSQR, which is an iterative method for sparse least squares, from a C implementation of the LINPACK library.

Optional parameters available in an illustrative embodiment are: 1) the, dimensionality of the semantic transform space; 2) latent term feedback; 3) latent document list; 4) document feedback. The value of the Lagrangian multiplier $\lambda$ in (7) determines the dimensionality of the transform space. The larger the value of $\lambda$, the smaller the number of concepts in transform space, and the coarser the clustering of documents. The effect of the regularization is that relevance weights are assigned more uniformly across a document collection. A relevance judgement is forced even for those documents which do not explicitly contain the keywords in the user query. These documents may contain relevant keyword structures in transform space. By contrast, an exact solution to equation (2) with A=0 corresponds to the rigid logic of the vector space model, where the documents are untransformed.

In an illustrative embodiment, the disclosed system achieves latency by sorting the coefficients in the solution to equation (7). Positive coefficients are associated with semantic bases which contain the keywords in the query; negative coefficients are associated with semantic bases which contain latent keywords.

Figure 5:
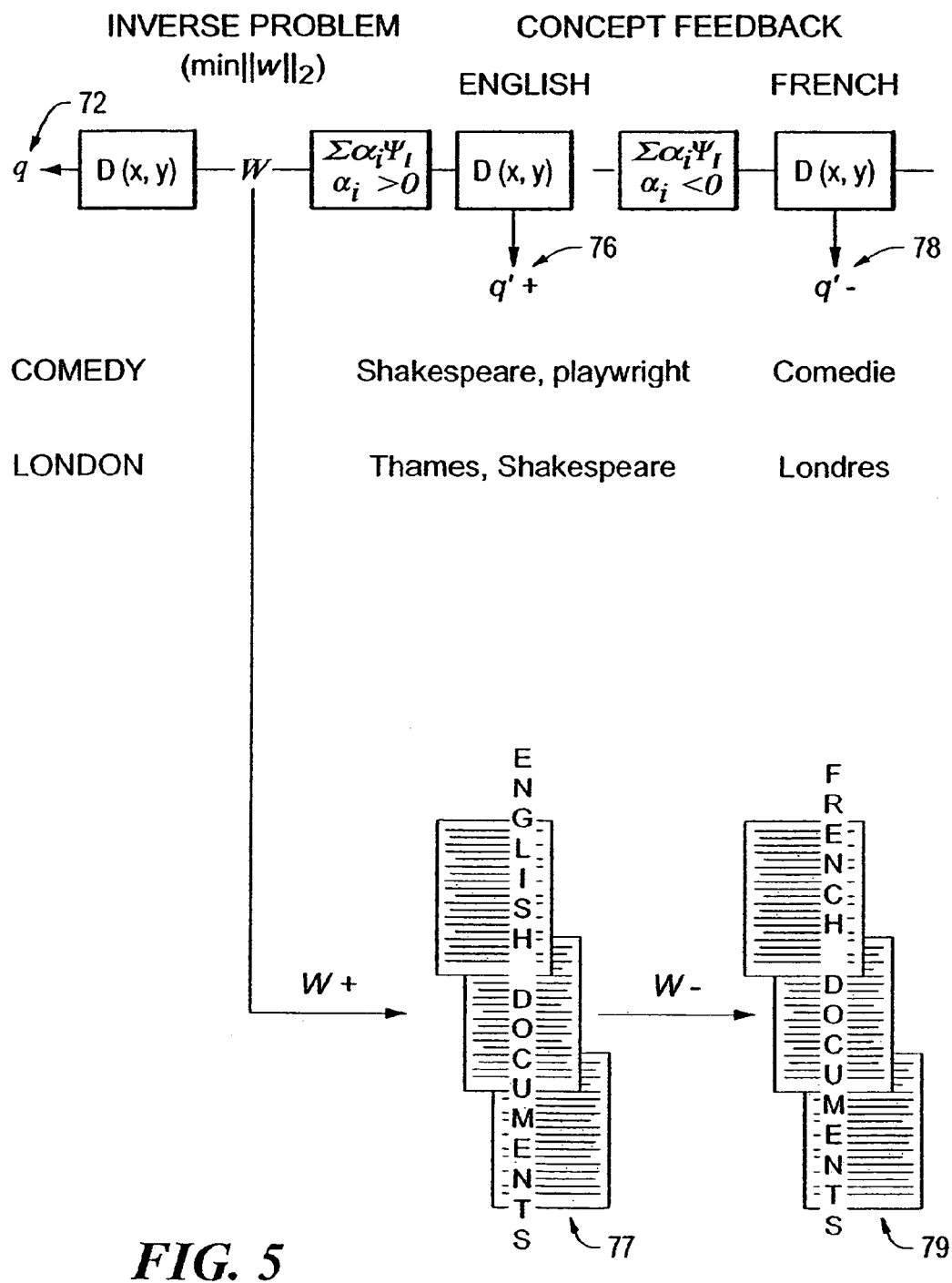
FIG. 5 illustrates a solution of the inverse optimization problem for a number of single term queries in a cross-language document retrieval system.

FIG. 5 shows the inverse optimization problem solved for a number of single keyword queries q 72. The output consists of direct concept feedback q'+ 76, which consists of concepts directly related to q in the source language, for example English in FIG. 5. The output further includes latent concept feedback q'− 78, which consists of French language concepts never associated with the English language q, but found in similar semantic relations across the two languages. This latent concept feedback (q'−) is shown for purposes of illustration as French concepts in FIG. 5. Also returned are lists of relevant documents for the two languages, shown as a list 77 of relevant English documents, and a list 79 of relevant French documents.

FIG. 6 illustrates a list of documents returned by the illustrative embodiment in response to the English language query 200 consisting of "theatre, comedy." Two separate ranked lists are returned: a first list 202 of direct hits, and a second list 204 of latent hits. Foreign language documents are found prevalently in the second list 204. Some French documents appear in the first list 202 because they contain one of the keywords in the query, "theatre." A by-product of the disclosed system for cross language retrieval is the alignment of semantic axes for the English, French and Italian subspaces, shown as Direct Keyword Suggestion and Relative Weights 206 and Latent Keyword Suggestion and Relative Weights 208. The distances between keywords in the three languages are generated as the absolute weights that each keyword should have in a fully multilingual query. That is, in response to the monolingual query theatre, comedy the engine retrieves multilingual documents, and also suggests to the user the foreign language keywords in 206 and 208, as well respective relative weights 210 and 212 that a fully multilingual query should have. Note that the keyword theatre is weighted twice as much as the Italian teatro, since it applies to twice as many languages (English and French). The keyword Shakespeare dominates the latent semantic space since it is the same in all languages.

Figure 7:
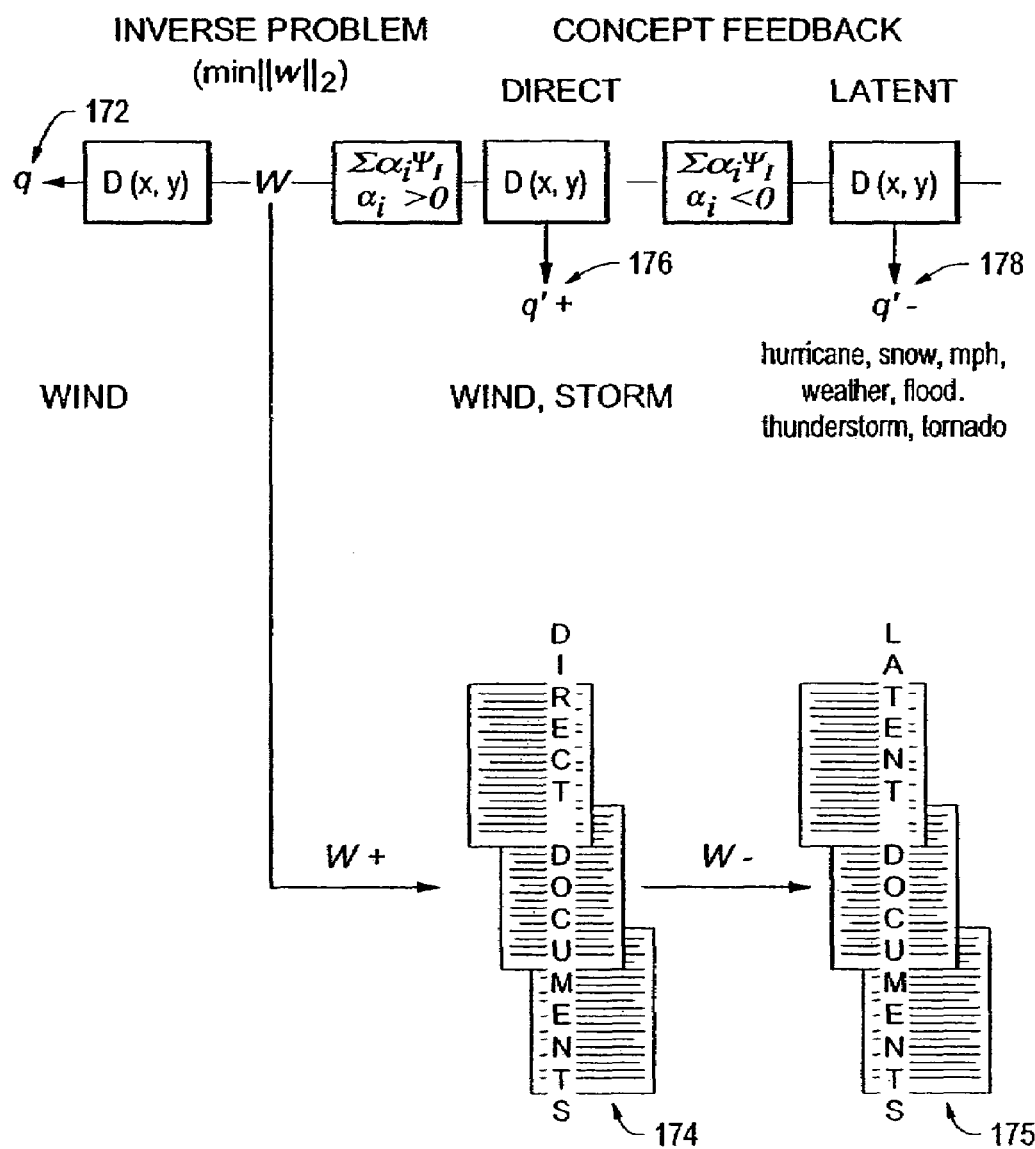
FIG. 7 illustrates a solution of the inverse optimization problem for a number of single term queries in an automatic, knowledge based training embodiment.

FIG. 7 illustrates semantic keyword feedback obtained by isolating positive and negative coefficients in the truncated basis function expansion for the query approximation $q_c$, in the disclosed automatic knowledge based training embodiment. As shown in FIG. 7, the inverse optimization problem is solved for a single keyword query q 172, shown for purposes of illustration as the word "wind". In the illustrative embodiment, the left hand partition of the term-document matrix provided as input consists of training information, for example the contents of the Encarta encyclopedia. The disclosed system then operates to form semantic relationships based on the contents of the training information, but returns results to the user only from the target documents described in the right hand side partition of the input term-document matrix, which represents the documents in the search space. In this way, the automatic knowledge based training embodiment of the disclosed system may be used to find information in the search space that is semantically relevant to the input query.

As shown in FIG. 7, the disclosed system returns direct concept feedback $q_{c+}$ 176, consisting of concepts in the target documents that are directly related to a term or terms from q 172, and latent concept feedback $q_{c-}$ 178, consisting of concepts never associated directly with the query term 172 in the target documents, but semantically linked within the reference documents to a term or terms from q 172. The list of directly relevant terms $q_{c+}$ 176 is shown for purposes of illustration consisting of the terms "WIND" and "STORM", while the list of indirectly relevant terms $q_{c-}$ 178 is shown consisting of the terms "hurricane, snow, mph, rain, weather, flood, thunderstorm, tornado".

Also in FIG. 7, the disclosed system is shown generating two lists of relevant documents: a list of direct documents 174, and a list of latent documents 175. The list of direct documents 174 indicates a number of relevant documents that contain one or more of the input query keywords. The list of indirect documents 175 indicates a number of relevant documents that do not contain a keyword from the input query.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 09/962,798, entitled "EXTENDED FUNCTIONALITY FOR AN INVERSE INFERENCE ENGINE BASED WEB SEARCH," filed on Sep. 25, 2001 (U.S. Pat. No. 6,757,646, issued Jun. 29, 2004); U.S. patent application Ser. No. 09/532,605, entitled "INVERSE INFERENCE ENGINE FOR HIGH PERFORMANCE WEB SEARCH," filed on Mar. 22, 2000 (U.S. Pat. No. 6,510,406, issued Jan. 21, 2003); and Provisional Application No. 60/235,255, entitled "EXTENDED FUNCTIONALITY FOR AN INVERSE INFERENCE ENGINE BASED WEB SEARCH," filed on Sep. 25, 2000, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

Appendix A (References not Listed in Strict Alphabetical Order)

Below is a list of the documents which provide background for and may be referred to in the present disclosure:

1. Backus, G., Inference from inadequate and inaccurate data, Proc. Nat. Acad. Sci. U.S., 65, pp. 1-7, pp. 281-287, and 67, pp. 282-289,1970.
2. Barbara, D., H. Garcia-Molina, D. Porter, The management of probabilistic data, IEEE Transactions on Knowledge and Data Engineering, 4, 5, pp. 487-502, 1992.
3. Bartell, B. T., W. C. Cottrell, and Richard K. Belew, Latent Semantic Indexing is an Optimal Special Case of Multidimensional Scaling, 1996
4. Bernstein, M, Bolter, J. D., Joyce, M., and Mylonas, E., Architecture for volatile hypertext, Hypertext 92: Proceedings of the Third ACM Conference on Hypertext, ACM Press, pp. 243-260, 1991
5. Berry, M., S. Dumais, G. O'Brien, Using linear algebra for intelligent information retrieval, SIAM Review, Vol. 37, No. 4, pp. 553-595, December 1995.
6. Boose, J. H., A knowledge acquisition program for expert systems based on personal construct psychology, International Journal of man-machine Studies, 23, pp 495-525
7. Chen, S., D. Donoho, M. Saunders, Atomic decomposition by basis pursuit, Stanford University, Department of Statistics Technical Report, February 1996.
8. Croft, B., and D. Harper. Using probabilistic models of document retrieval without relevance information, Journal of Documentation 35(4), pp 285-295, 1979
9. Collins, M., A new Statistical parser based on bigram lexical dependencies, Proceedings of the 34th Annual Meeting of the Association for Computational Linguistics, pp. 184-191, 1996.
10. Collins, M., Tree generative, lexicalised models for statistical parsing, Proceedings of the 35th Annual Meeting of the Association for Computational Linguistics, pp. 16-23, 1997.
11. Deerwester, S., Dumais, S. T., Furnas, G. W., Landauer, T. K., & Harshman, R. (1990). Indexing By Latent Semantic Analysis. Journal of the American Society For Information Science, 41, 391-407.
12. Dumais, S. T., Platt, J., Heckerman, D., and Sahami, M., Inductive Learning Algorithms and Representations for Text Categorization, Proceedings of ACM-CIKM98, November 1998.
13. Dumais, S. T., Landauer, T. K. and Littman, M. L. (1996) "Automatic cross-linguistic information retrieval using Latent Semantic Indexing." In SIGIR'96.
14. Dumais, S. T., Letsche, T. A., Littman, M. L. and Landauer, T. K. (1997) "Automatic cross-language retrieval using Latent Semantic Indexing." In AAAI Spring Symposuim on Cross-Language Text and Speech Retrieval, March 1997.
15. EMIR. Final report of the EMIR project number 5312. Technical report, European Multilingual Information Retrieval Consortium For the Commission of the European Union, Brussels, October 1994.
16. Foltz, P. W., Kintsch, W.,& Landauer, T. K. (1998). The measurement of textual Coherence with Latent Semantic Analysis. Discourse Processes, 25, 285-307.
17. Fung, R. and B. Del Favero, Applying Bayesian networks to information retrieval, Communications of the ACM, March 1995
18. Kintsch, W. Metaphor comprehension: A computational theory. Psychonomic Bulletin and Review, (in press)
19. Laham, D. (1997). Latent Semantic Analysis approaches to categorization. In M. G. Shafto & P. Langley (Eds.), Proceedings of the 19th annual meeting of the Cognitive Science Society (p. 979). Mawhwah, N.J.: Erlbaum.
20. Landauer, T. K., & Dumais, S. T. (1997). A solution to Plato's problem: The Latent Semantic Analysis theory of the acquisition, induction, and representation of knowledge. Psychological Review, 104, 211-240.
21. Landauer, T. K., Foltz, P. W., & Laham, D. (1998). Introduction to Latent Semantic Analysis. Discourse Processes, 25, 259-284.
22. Landauer, T. K., Laham, D., & Foltz, P. W., (1998). Learning human-like knowledge by Singular Value Decomposition: A progress report. In M. I. Jordan, M. J. Kearns & S. A. Solla (Eds.), Advances in Neural Information Processing Systems 10, (pp. 45-51). Cambridge: MIT Press.
23. Landauer, T. K., Laham, D., Rehder, B., & Schreiner, M. E., (1997). How well can passage meaning be derived without using word order? A comparison of Latent Semantic Analysis and humans. In M. G. Shafto & P. Langley (Eds.), Proceedings of the 19th annual meeting of the Cognitive Science Society (pp. 412-417). Mawhwah, N.J.: Erlbaum.
24. Madigan, D. and J. York. Bayesian graphical models for discrete data. International Statistical Review 63, 215-32
25. Malvestuto, F. M., A unique formal system for binary decomposition of database relations, probability distributions and graphs, Information Science, 59, 1-2, pp. 21-52, 1992
26. Marchisio, G. B., Rogers, R. and Ngyuen, T. An Inverse Inference Engine for High Precision Web Search, Phase I Final Report, DARPA SBIR contract DAAH01-99-C-R162, December 1999.
27. Miller, S., Crystal, M., Fox, H., Ramshaw, L., Schwartz, R., Stone, R., Weischedel, R., Algorithms that learn to extract information, Proceedings of MUC-7, 1998.
28. Parker, R., Understanding inverse theory, Ann. Rev. Earth Planet. Sci., 5, pp. 35-64, 1977.
29. Pittarelli, M., An algebra for probabilistic databases, IEEE Transactions on Knowledge and Data Engineering, 6, 2, pp. 293-303, 1994
30. Pittarelli, M., Probabilistic Databases and Decision Problems: Results and a Conjecture, Kybernetica, 29, 2, pp. 149-65, 1993
31. Pittarelli, M., Probabilistic databases for decision analysis, International Journal of Intelligent Systems, 5, 2, pp. 209-36, 1990
32. Press, W. H., Teukolsky, S. A., Vettering, W. T., Flannery, B. P., Numerical Recipes in C, Cambridge University Press, 1997.
33. Robertson, S., The Probability Ranking Principle in IR. Journal of Documentation, 1977
34. Silberschatz, H. F. Korth, and S. Sudarshan Database System Concepts, Third Edition, McGraw-Hill, 1998
35. Van Rijsbergen, C., Information Retrieval (second ed.) London: Butterworths, 1979

36. Waltz, D. L., and Pollack, J. B., massively parallel parsing: a strong interactive model of natural language interpretation, Cognitive Science, 9, pp. 51-74, 1985
37. Wolfe, M. B., Schreiner, M. E., Rehder, B., Laham, D., Foltz, P. W., Kintsch, W., & Landauer, T. K. (1998). Learning from text: Matching readers and text by Latent Semantic Analysis. Discourse Processes, 25, 309-336.
38. Hartman, D., R. Baeza-Yates, E. Fox, and W. Lee, Inverted Files, in Information Retrieval, edited by W. F. Frakes and R. Baeza-Yates, Prentice-Hall, 1992.
39. Wickerhauser, M. V, Adapted Wavelet Analysis from theory to software, 1994
40. Lopresti, D., and J. Zhou, Retrieval strategies for noisy text, *Fifth Annual Symposium on Document Analysis and Information Retrieval*, pp. 255-269, Las Vegas, April 1996.
41. Salton, G., E. Fox, U. Wu, Extended Boolean information retrieval, *Communications ACM*, 26, pp. 1022-1036, 1983.

The invention claimed is:

1. A multi-language information retrieval method for retrieving information from a plurality of target documents using at least one reference document, the target documents and at least one reference document stored as electronic information files in a computer system, comprising:
   generating a term-document matrix to represent the electronic information files,
      each element in the term-document matrix indicating a measure of a number of occurrences of a term within a respective one of the electronic information files,
      the term-document matrix including a first partition of entries that represent a first version of the at least one reference document comprising content in a first natural language and a second version of the at least one reference document comprising content in a second natural language such that the first and second versions of the reference document can be used to semantically link documents between the first and second natural languages,
      the term-document matrix including a second partition of entries that represent the target documents,
      the target documents comprising content in the first natural language or the second natural language;
   generating a term-spread matrix that is a weighted autocorrelation of the generated term-document matrix, the term-spread matrix indicating an amount of variation in term usage in the information files and an extent to which terms are correlated;
   receiving a query consisting of at least one term;
   in response to receiving the query, generating a query vector having as many elements as rows of the generated term-spread matrix;
   formulating, based upon the generated term-spread matrix and query vector, a constrained optimization problem description for determining a degree of correlation between the query vector and the target documents, wherein the choice of a stabilization parameter determines the extent of a trade-off between a degree of fit and stability of all solutions to the constrained optimization problem description;
   determining a solution vector to the constrained optimization problem description, the vector including a plurality of document weights, each weight corresponding to one of the target documents and reflecting a degree of correlation between the query and the corresponding target document; and
   providing a response to the received query that reflects the document weights.

2. The method of claim 1 wherein at least one of the document weights in the determined solution vector is positive and at least one of the document weights in the determined solution vector is negative, wherein the positive document weights represent the relevance of the corresponding target documents in the first natural language to the query, and wherein absolute values of the negative document weights represent the relevance of the corresponding target documents in the second natural language to the query.

3. The method of claim 1, the providing the response further comprising:
   organizing, according to the sign of each document weight, display objects that represent the target documents that correspond to the document weights, thereby displaying the objects that represent documents comprising content in the first natural language in proximity to each other and displaying the objects that represent documents comprising content in the second natural language in proximity to each other.

4. The method of claim 3, the providing the response further comprising:
   organizing the display objects according to the absoLute value of each document weight, such that the display objects are displayed in decreasing absolute value of the corresponding document weights.

5. The method of claim 1 wherein each row of the term-document matrix is associated with a respective term, and wherein a first set of the rows are associated with terms in the first natural language and a second set of the rows are associated with terms in the second natural language.

6. The method of claim 1 wherein the second version of the reference document comprises terms that are a translation into the second natural language of terms of the first version of the reference document.

7. The method of claim 1 wherein the second version of the reference document is topically related to the first version of the reference document.

8. The method of claim 7 wherein the second version of the reference document is a translation into the second natural language of the first version of the reference document comprising content in the first natural language.

9. The method of claim 1 wherein the first version and the second version of the reference document are used to find semantic links from terms in the first natural language to terms in the second natural language.

10. The method of claim 1, wherein the term-document matrix is one of a plurality of term-document matrices, each term-document matrix having a first partition similar to the first partition of the term-document matrix and having entries that represent content in a first natural language and content in a second natural language, each term-document matrix associated with a translation from a source language to a different target foreign language, wherein, in each term-document matrix, the first natural language comprises the source language and the second natural language comprises the target foreign natural language.

11. The method of claim 1, the first partition further comprising entries that represent a third version of the at least one reference document comprising content in a third natural language, such that the first, second, and third versions of the at Least one reference document can be used to semantically line documents between the first, second, and third natural languages.

12. The method of claim 11 wherein the first and second versions of the at least one reference document are used to translate terms between the first and second natural language and the first and third versions of the at least one reference document are used to translate terms between the first and third natural language.

13. A computer-readable memory medium containing instructions that control a computer processor to retrieve information from a plurality of target documents using at least one reference document, the target documents and at least one reference document stored as electronic information files in a computer system, by:

generating a term-document matrix to represent the electronic information files,
   each element in the term-document matrix indicating a measure of a number of occurrences of a term within a respective one of the electronic information files,
   the term-document matrix including a first partition of entries that represent a first version of the at least one reference document comprising content in a first natural language and a second version of the at least one reference document comprising content in a second natural language such that the first and second versions of the reference document can be used to semantically link documents between the first and second natural languages,
   the term-document matrix including a second partition of entries that represent the target documents,
   the target documents comprising content in the first natural language or the second natural language;
generating a term-spread matrix that is a weighted auto-correlation of the generated term-document matrix, the term-spread matrix indicating an amount of variation in term usage in the information files and an extent to which terms are correlated;
receiving a query consisting of at least one term;
in response to receiving the query, generating a query vector having as many elements as rows of the generated term-spread matrix;
formulating, based upon the generated term-spread matrix and query vector, a constrained optimization problem description for determining a degree of correlation between the query vector and the target documents, wherein the choice of a stabilization parameter determines the extent of a trade-off between a degree of fit and stability of all solutions to the constrained optimization problem description;
determining a solution vector to the constrained optimization problem description, the vector including a plurality of document weights, each weight corresponding to one of the target documents and reflecting a degree of correlation between the query and the corresponding target document; and
providing a response to the received query that reflects the document weights.

14. The memory medium of claim 13 wherein at least one of the document weights in the determined solution vector is positive and at least one of the document weights in the determined solution vector is negative, wherein the positive document weights represent the relevance of the corresponding target documents in the first natural language to the query, and wherein absolute values of the negative document weights represent the relevance of the corresponding target documents in the second natural language to the query.

15. The memory medium of claim 13, the response further comprising:
organizing, according to the sign of each document weight, display objects that represent the target documents that correspond to the document weights, thereby displaying the objects that represent documents comprising content in the first naturaL language in proximity to each other and displaying the objects that represent documents comprising content in the second natural language in proximity to each other.

16. The memory medium of claim 15, the response further comprising:
organizing the display objects according to the absolute value of each document weight, such that the display objects are displayed in decreasing absolute value of the corresponding document weights.

17. The memory medium of claim 13 wherein each row of the term-document matrix is associated with a respective term, and wherein a first set of the rows are associated with terms in the first natural language and a second set of the rows are associated with terms in the second natural language.

18. The memory medium of claim 13 wherein the second version of the reference document comprises terms that are a translation into the second natural language of terms of the first version of the reference document.

19. The memory medium of claim 13 wherein the second version of the reference document is topically related to the first version of the reference document.

20. The memory medium of claim 19 wherein the second version of the reference document is a translation into the second natural language of the first version of the reference document comprising content in the first natural language.

21. The memory medium of claim 13 wherein the first version and the second version of the reference document are used to find semantic links from terms in the first natural language to terms in the second natural language.

22. The memory medium of claim 13 wherein the term-document matrix is one of a plurality of term-document matrices, each term-document matrix having a first partition similar to the first partition of the term-document matrix and having entries that represent content in a first natural language and content in a second natural language, each term-document matrix associated with a translation from a source language to a different target foreign language, wherein, in each term-document matrix, the first natural language comprises the source language and the second naturaL language comprises the target foreign natural language.

23. The memory medium of claim 13, the first partition further comprising entries that represent a third version of the at least one reference document comprising content in a third natural language, such that the first, second, and third versions of the at least one reference document can be used to semantically line documents between the first, second, and third natural languages.

24. The memory medium of claim 23 wherein the first and second versions of the at least one reference document are used to translate terms between the first and second natural language and the first and third versions of the at least one reference document are used to translate terms between the first and third natural language.

25. An information retrieval system having a plurality of target documents and at least one reference document stored as electronic information files, comprising:
a memory;
an information file processing component stored on the memory that is configured to, when executed
   generate a term-document matrix to represent the electronic information flies, each element in the term-document matrix indicating a measure of a number of occurrences of a term within a respective one of the electronic information files, the term-document matrix including a first partition of entries that represent a first version of the at least one reference document comprising content in a first natural language and a second version of the at least one reference document comprising content in a second natural language such that the first and second versions of the reference document can be used to semantically link documents between the first and second natural languages, the term-document matrix including a second partition of entries that represent the target documents, the target documents comprising content in the first natural language or the second natural language; and generate a term-spread matrix that is a weighted autocorrelation of the generated term-document matrix, the term-spread matrix indicating an amount of variation in term usage in the information files and an extent to which terms are correlated;

a query mechanism stored on the memory that is configured to, when executed, receive a query of at least one term and to generate a query vector having as many elements as the rows of the generated term-spread matrix; and an inverse inference engine stored on the memory that is configured to, when executed formulate, based upon the generated term-spread matrix and the query vector, a constrained optimization problem description for determining a degree of correlation between the query vector and the target documents, wherein the choice of a stabilization parameter determines the extent of a trade-off between a degree of fit and stability of all solutions to the constrained optimization problem description;

determine a solution vector to the constrained optimization problem description, the solution vector including a plurality of document weights, each weight corresponding to one of the target documents and reflecting a degree of correlation between the query and the corresponding target document; and provide a response to the received query that reflects the document weights.

26. The information retrieval system of claim 25 wherein at least one of the document weights in the determined solution vector is positive and at least one of the document weights in the determined solution vector is negative, wherein the positive document weights represent the relevance of the corresponding target documents in the first natural language to the query, and wherein absolute values of the negative document weights represent the relevance of the corresponding target documents in the second natural language to the query.

27. The information retrieval system of claim 25, the response further comprising:

display objects that each represent a target documents that correspond to one of the document weights and are organized according to the sign of each document weight, thereby causing the objects that represent documents comprising content in the first natural language to be displayed in proximity to each other and the objects that represent documents comprising content in the second natural language to be displayed in proximity to each other.

28. The information retrieval system of claim 26, the objects further structured to be organized according to the absolute value of each document weight, thereby causing the objects to be displayed in decreasing absolute value of the corresponding document weights.

29. The information retrieval system of claim 25 wherein each row of the term-document matrix is associated with a respective term, and wherein a first set of the rows are associated with terms in the first natural language and a second set of the rows are associated with terms in the second natural language.

30. The information retrieval system of claim 25 wherein the second version of the reference document comprises terms that are a translation into the second natural language of terms of the first version of the reference document.

31. The information retrieval system of claim 25 wherein the second version of the reference document is topically related to the first version of the reference document.

32. The information retrieval system of claim 31 wherein the second version of the reference document is a translation into the second natural language of the first version of the reference document comprising content in the first natural language.

33. The information retrieval system of claim 25 wherein the first version and the second version of the reference document are used to find semantic links from terms in the first natural language to terms in the second natural language.

34. The information retrieval system of claim 25 wherein the term-document matrix is one of a plurality of term-document matrices, each term-document matrix having a first partition similar to the first partition of the term-document matrIx and having entries that represent content in a first natural language and content in a second natural language, each term-document matrix associated with a translation from a source language to a different target foreign language, wherein, in each term-document matrix, the first natural language comprises the source language and the second natural language comprises the target foreign natural language.

35. The information retrieval system of claim 25, the first partition further comprising entries that represent a third version of the at least one reference document comprising content in a third natural language, such that the first, second, and third versions of the at least one reference document can be used to semantically line documents between the first, second, and third natural languages.

36. The information retrieval system of claim 35 wherein the first and second versions of the at least one reference document are used to translate terms between the first and second natural language and the first and third versions of the at feast one reference document are used to translate terms between the first and third natural language.

* * * * *